United States Patent [19]

Seiler

[11] Patent Number: 5,202,960
[45] Date of Patent: Apr. 13, 1993

[54] METHOD AND APPARATUS FOR PLOTTING POLYGON EDGES ON A PIXELIZED GRID

[75] Inventor: Larry D. Seiler, Boylston, Mass.

[73] Assignee: Digital Equipment Corporation, Maynard, Mass.

[21] Appl. No.: 266,441

[22] Filed: Nov. 2, 1988

[51] Int. Cl.[5] .......................................... G06F 15/20
[52] U.S. Cl. .................................................... 395/143
[58] Field of Search ................. 364/518, 521, 522; 340/721, 723, 724; 395/142, 143, 132

[56] References Cited

U.S. PATENT DOCUMENTS

| | | | |
|---|---|---|---|
| 4,601,002 | 7/1986 | Rosenthal | 364/518 |
| 4,672,369 | 6/1987 | Preiss et al. | 340/723 |
| 4,758,965 | 7/1988 | Liang et al. | 364/518 |

OTHER PUBLICATIONS

Bresenham, Ambiguities in Incremental Line Rastering, IEEE CG&A, pp. 31–43 (1987).
Field, Incremental Linear Interpolation, pp. 1–15.

*Primary Examiner*—H. A. Herndon
*Attorney, Agent, or Firm*—Arnold, White & Durkee

[57] ABSTRACT

Incremental methods of drawing (respectively) polygon edges, wide-line edges, and single-pixel-wide vectors on a pixelized grid. The methods make use of improved, Bresenham-like algorithms for computing the next pixel to be drawn, in which novel decision variables are utilized. The decision variables are designed to be computable in a reduced number of bits. The algorithms and their decision variables permit the use of comparatively simple circuitry for computation.

16 Claims, 17 Drawing Sheets

Butt — Round — Projecting

Cap Styles

Miter — Round — Projecting

Join Styles

METHOD AND APPARATUS FOR PLOTTING POLYGON EDGES ON A PIXELIZED GRID

TABLE OF CONTENTS

I. BACKGROUND OF THE INVENTION
  A. Cross Reference to Related Applications
  B. Graphic Display Systems
  C. The X Window System (tm) Specification
  D. The X Window System Requirement for Drawing Polygons
  E. Wide Line Drawing Under the X Window System
  F. The X Window System Requirement for Drawing Vectors
  G. X-Major and Y-Major Classifications for Drawing Vectors
  H. Incremental Approaches to Pixel Drawing
  I. Bresenham's Algorithm for Vector Drawing
  J. The Bresenham Decision Variable
  K. Drawing Pixels Using the Bresenham Algorithm
  L. Difficulties with Bresenham Algorithm
  M. Drawing Polygons
II. SUMMARY OF THE INVENTION
III. BRIEF DESCRIPTION OF THE DRAWINGS
IV. DETAILED DESCRIPTION OF SPECIFIC EMBODIMENTS
  1. IMPROVED COMPUTATION OF POLYGON EDGES
    1.1 Locating Polygon Edge Pixels
    1.2 Polygon Edge Decision Variable
    1.3 Basic Iterative Method for Locating Polygon Edge
    1.4 General Iterative Method for Locating Polygon Edge
    1.5 Derivation of General Polygon-Edge Determination Method
    1.6 Hardware Implementation
  2. WIDE-LINE EDGE COMPUTATIONS
    2.1 Preliminary Analysis
    2.2 Decision Variable Using Improved Distance Metric
    2.3 Method Using Improved Decision Variable
    2.4 Locating Vertices of Wide Lines
    2.5 Wide Line Ends
    2.6 Hardware Implementation
  3. IMPROVED SINGLE-PIXEL-WIDE VECTOR DRAWING
    3.1 Stepping Along Single-Pixel-Wide (SPW) Vectors
    3.2 Improved SPW Decision Variable
    3.3 Left Edge-Stepping Method for SPW Vectors
    3.4 Right Edge-Stepping Method for SPW Vectors
    3.5 Computational Effect of Variations in dx and dy
    3.6 General SPW Drawing Method
    3.7 Single-Operation Computation
    3.8 Hardware Implementation
  4. REDUCED-BIT DECISION VARIABLE
    4.1 Number Representation
    4.2 Dividing Terms by 2
    4.3 Testing for Overflow: Special Case
    4.4 Testing for Overflow: General Case
    4.5 Hardware Implementation
CLAIMS

I. BACKGROUND OF THE INVENTION

A. Cross Reference to Related Applications

B. Graphic Display Systems

The present invention relates to a method for drawing approximations of shapes on or in a graphic display system, e.g., in connection with a computer terminal screen or similar device. For purposes of illustration, a raster display system will be described as an example of such a system.

Referring to FIG. 1, a raster display 15 generally includes a large number of discrete picture elements, or pixels 16, which are selectively lighted or "drawn" (sometimes referred to as "painted") by the electron beam of a raster scanner to produce an image. The pixels are typically arranged in a uniform grid; the grid ordinarily is of sufficient density that it substantially covers the display 15.

The raster display 15 operates (generally speaking) by focusing the electron beam at the top left corner of the grid. The beam is moved horizontally across the top row (referred to as a "scanline"), and turned on and off as necessary to draw or paint the particular pixels in the top row that are to be lighted. The beam is moved down to each scanline in turn, and pixels in that are selectively drawn. This process takes place many times a second, creating the visual image of a continuous screen display.

Although the electron beam of the raster display 15 moves across the grid many times per second, the image being displayed may stay constant for a relatively long time. It would be highly undesirable to be required to recompute, with every scan of the grid, precisely which pixels to draw.

Thus, it is common to harness the on- and off cycling of the electron beam to the contents of a special memory, referred to as a display buffer (such as a frame buffer). In a bit-mapped display buffer, for example, each pixel is allocated a portion of memory that is sufficient to store "on" and "off" values. A computer or other device can order a given pixel to be drawn until further notice by setting the associated memory in the diplay buffer to "on." The electron beam then draws that pixel on each scanning pass until the associated memory is reset to "off."

Generating the image of an arbitrary polygon 20 on the raster display 15 thus entails writing certain particular data to the display buffer to control the electron beam on its scanning passes. This particular data causes the electron beam to draw those pixels 16—and only those pixels—that as a group have the effect of approximating the polygon 20. These are the pixels that are in some manner closest to the true area of the polygon.

(It will be appreciated by those of ordinary skill, of course, that similar bit-mapped graphics techniques are commonly used in other types of systems, e.g., liquid crystal display (LCD) systems, laser printers, and the like.)

It will be recognized by those of ordinary skill that, while the electron beam typically moves from left to right and from top to bottom, writing operations to the display buffer are not restricted to that order. As discussed herein, a line or region of pixels may be "written" by setting the appropriate memory locations in the display buffer; these locations can be written in virtually any desired order.

(The term "drawing" of pixels is hereinafter used interchangeably, when required, to refer both to the writing of data to the display buffer and to the actual drawing operation carried out by the electron beam.)

C. The X Window System (tm) Specification

One of the advantages of the method disclosed below is that it satisfies the so-called X Window System specification developed in part by Robert W. Scheifler at the Massachusetts Institute of Technology, for drawing vectors and other shapes on a raster display. (X Window System is a trademark of the Massachussetts Institute of Technology.) This specification sets forth specific goals for the drawing process to promote increased compatibility among different hardware and software architectures. The document, "X Window System Protocol, Version 11, June 1987," is incorporated herein by reference. (The method is also believed to be useful under other drawing rules, and its use under the X Window System is not intended to be limiting of the scope of the claims.)

D. The X Window System Requirement for Drawing Polygons

In filling a region such as a polygon or wide line under the X Window System, the pixels that are considered to be within the region are (i) those whose center points are inside the edges of the regions; (ii) those whose center points are on the edge with the inside of the region being to the right of the edge, that is, in the direction of increasing x; (iii) those whose center points are on a horizontal edge with the inside below the edge, that is, in the direction of decreasing y. FIG. 2 illustrates a polygon 20 superimposed on a pixelized display 15 in which the pixels of a single scanline that are within the polygon 20 are drawn in accordance with the X Window System. In this illustration, "right" and "down" refer to directions on the display screen.

When two polygons or other regions are drawn so that they touch, compliance with the above X Window System requirement ensures that each pixel along their common boundary is considered to be inside exactly one of the regions. This is illustrated in FIG. 1, which shows two polygons 20 and 21 that have a common edge 22; each pixel whose center is on the edge 22 is considered to be inside the right-most polygon 21.

Under the X Window System, the order in which the edges of a polygon are specified is immaterial. In other words, a polygon should be drawn identically whether the edges are specified in one order or another. The X Window System standard includes rules for filling polygons, including the so-called even/odd and winding-number rules for filling self-intersecting polygons.

E. Wide Line Drawing Under the X Window System

X Window System "wide lines" are polygonal regions that are defined by a line segment and a width. FIG. 3 shows a typical wide line 23, whose edges 25 and 27 are positioned parallel to and horizontally displaced from a central-axis line segment 29; remaining edges 31 and 33 are positioned perpendicular to the line segment 29 at the ends of the wide line 23. (For clarity, a portion of FIG. 3 is shown without pixels.)

The set of all pixels bounded by these four edges defines the wide line 23. The intersections of the respective mutually perpendicular edges of the wide line 23 are the vertices of the wide line.

Under the X Window System, the order of definition of the vertices of the central line segment 29 should be immaterial, that is, the wide line should be drawn identically no matter in what order the vertices are defined.

The wide line's width w is measured perpendicular to the line segment 29. The distance from the line segment 29 the wide line is the projection of the half-width w/2 onto the x axis.

Several different types of ends (or "caps") and joints are defined in the X Window System. Some of these are illustrated in FIG. 4.

F. The X Window System Requirement for Drawing Vectors

The X Window System for drawing single-pixel-wide vectors requires that the drawing process be invariant in translation.

As an example, consider a vector V1 that is drawn from a point P1=(x1, y1) to a point P2=(x2, y2), as shown in FIG. 5. Assume that the drawing process fills a pixel whose center is the point (x,y). Under the X Window System, if a vector V1' is drawn between a point P1'=(x1+h, y1+k) and a point P2 =(x2+h, y2+k), then the pixel whose center is the point (x+h, y+k) must also be filled.

The X Window System specification recommends that implementers of the X Window System provide endpoint invariance as well. That is, drawing the vector V1 from P1 to P2 should result in drawing of the same pixels as drawing from P2 to P1. The X Window System specification notes that it may be aesthetically bad to mix end vectors and wide lines because they may not use the same criteria (a difficulty that is among the matters addressed by the present invention).

G. X-major and Y-major Classifications for Drawing Vectors

All three of the drawing situations discussed above—drawing polygons, drawing wide lines, and drawing single-pixel-wide vectors—share a common problem, namely that of determining which pixels most closely approximate a specified line that is either an edge of a polygon (or wide line) or a vector. In the discussion below, this problem is discussed in terms of drawing a vector.

In drawing vectors on, e.g., a raster display, several methods are commonly used. Some of these methods depend upon classifiying the vector according to its orientation with respect to a coordinate system superimposed onto the raster display.

FIG. 6 shows a vector V2 of arbitrary length and orientation as it might appear on a raster display. The vector extends from an arbitrary point (x[a], y[a]) to another arbitrary point (x[b], y[b]).

If a Cartesian coordinate system is superimposed onto the pixel grid (not shown in FIG. 6), the vector V2 can be uniquely described in point-slope form according to the rules of elementary analytic geometry. The coordinate system can be transformed by translating the vector to a new origin (0,0), further simplifying this analytic description. The translated vector V2' is thus assumed to extend from the point (0,0) to the point (dx, dy).

The slope of the vector V2, can be used to classify the orientation of the vector with respect to the coordinate system. For simplicity, consider only vectors lying in the first quadrant of the Cartesian coordinate system.

FIG. 7 shows a vector X1 of slope less than 1, i.e., in which dy<dx. This vector is classified as X-major since its horizontal component has the larger value.

Conversely, a vector Y1 shown in FIG. 7 has a slope greater than 1, i.e., in vector Y1, dy>dx. This vector is classified as Y-major since its vertical component has the larger value. A vector whose slope is equal to 1, i.e., dy=dx, can be treated as either an X-major or a Y-major vector.

These classifications aid in determining how to move along the length of the vector when drawing it on the pixel grid, as illustrated below.

H. Incremental Approaches to Pixel-Drawing

Referring to FIG. 8, assume as a given a (translated) X-major vector V3 that angles generally up and to the right from an initial point (0,0) to an endpoint (dx, dy). The vector V3 is to be drawn on a pixelized display; for clarity, only selected pixels 16 are shown in FIG. 8, and these pixels are shown in a greatly expanded form.

Assume that the distance between any pixel 16 and the vector V3 is defined by the distance, measured vertically, between the center of that pixel and the vector (as opposed to, e.g., the distance between an edge of the pixel and the vector).

Assume further that the (respectively uniform) width and height of the pixels 16 define the integer unit of measurement along the x and y axes, so that references to integers are references to the same number of pixel widths or heights.

As a nomenclature convention, define a pixel as being a pixel (x,y) if the pixel's center is a point (x,y).

Under the X Window System, the numbers dx and dy are assumed both to be integers. The pixels (0,0) and (dx,dy) are thus assumed to be pixels that will be drawn. (This assumption is not necessarily true under non-X Window System drawing rules—in some circumstances, either or both endpoints may be other than at the center of a pixel, referred to as subpixel positioning.)

Assume that a pixel (r,q) has been determined to approximate a point on the vector V3, and has therefore been drawn, as shown by cross-hatching in FIG. 8. The pixel (r+1, q) lies just to the right of the pixel (r,q). The pixel (r+1, q+1) lies immediately up and to the right of the pixel (r,q).

(In this discussion, except where indicated, "right" is used to indicate increasing values of x, and "up" is used to indicate increasing values of y.)

The question is then: to continue the drawing of the vector V3, which of these two pixels should be drawn, the pixel (r+1, q), or the pixel (r+1, q+1)?

This question is addressed by the method of the present invention.

I. Bresenham's Algorithm for Vector Drawing

The method of the present invention is more readily described by first describing the simpler prior-art Bresenham's algorithm.

Generally speaking, Bresenham's algorithm calls for drawing a vector on a raster display by stepping along the vector in integral amounts of the pixel grid and, at each step, selecting a pixel for drawing. The explanation which follows refers to the X-major vector V3 shown in FIG. 8; the same general explanation applies to Y-major vectors.

Assume that the particular pixel (r,q) has been drawn. Consider the interval between these two points (r+1, q), and (r+1, q+1). The vector V3 necessarily intersects this interval.

So, define a variable s to be the portion of the interval that lies below the vector V3. Likewise, define a variable t to be the portion of the interval that lies above the vector V3.

Stated another way, s represents the distance between the vector V3 and the point (r+1, q), and t represents the distance between the vector v3 and the point (r+1, q+1). (Plainly, s+t=1.)

If s<t, then the pixel (r+1, q) should be drawn, since that point is closer to the vector V3 than is the point (r+1, q+1). Otherwise, the pixel (r+1, q+1) should be drawn, since it is a better approximation of a point on the vector V3 (or at least as good, if s=t).

Therefore, drawing the vector V3 from its origin (0,0) to its other endpoint (dx,dy) becomes a matter of stepping along and, at each ith step: (a) computing whether the distance s[i] for that step, i.e., for the next pixel to be drawn, is less than the distance t[i] for that step, and (b) drawing either the pixel (r[i]+1, q[i]+1), or the pixel (r[i]+1, q[i]), depending on the outcome of the computation.

J. The Bresenham Decision Variable

The computation at (a) in the previous paragraph is equivalent to determining whether $s[i]-t[i]<0$, i.e., determining the sign of $(s[i]-t[i])$. The respective values of s[i] and t[i] can be calculated from simple geometry:

$$s[i]=(dy/dx)*(r[i]+1)-q[i] \tag{1}$$

$$t[i]=1-s[i] \tag{2}$$

(As used herein, * indicates multiplication and ^ indicates exponentiation, that is, a*b indicates a times b, and a^b indicates a raised to the bth power.)

Since dx is positive by hypothesis, this number (s[i]−t[i]) can be multiplied by dx and still retain its sign; thus, dx*(s[i]−t[i]) can be used to select the next pixel to be drawn instead of (s[i]−t[i]). Replacing t[i] with 1−s[i] in accordance with equation (2):

$$\begin{aligned} dx*(s[i]-t[i]) &= dx*(2s[i]-1) \\ &= 2*r[i]*dy - 2*q[i]*dx + 2*dy - dx \end{aligned} \tag{3}$$

For convenience, define the value of dx*(s[i]−t[i]) to be a decision variable d[i] for determining which pixel to draw in the ith step. Likewise, replace r[i] and q[i] (which by hypothesis serve to define the pixel drawn just before before the ith step) with x[i−1] and y[i−1], respectively. In other words:

$$dx*(s[i]-t[i]) \rightarrow d[i] \tag{4}$$

$$r[i] \rightarrow x[i-1] \tag{5}$$

$$q[i] \rightarrow y[i-1] \tag{6}$$

Hence the decision variable d[i] may be expressed as follows:

$$d[i]=2x[i-1]*dy-2y[i-1]*dx+2dy-dx, \tag{7}$$

d[i] thus being a function not only of the difference between the respective distances s[i] and t[i], but equivalently of the coordinate values of the point (x[i−1], y[i−1]).

The equation (7) defining the decision variable d[i] remains true for d[i+1]. This suggests the possibility of an iterative method for drawing the proper pixels to approximate the vector 20. By subtraction, $$d[i+1]-d[i]=2dy*(x[i]-x[i-1])-2dx*(y[i]-y[i-1]) \quad (8)$$

For an X-major vector, $x[i]-x[i-1]=1$ by definition. Hence, in an X-major vector, $$d[i+1]-d[i]=2dy-2dx(y[i]-y[i-1]) \quad (9)$$

meaning that after each step i is complete, the decision variable d for the next step i+1 can be expressed as:

$$d[i+1]=d[i]+2dy-2dx(y[i]-y[i-1]) \quad (10)$$

K. Drawing Pixels Using the Bresenham Decision Variable

The decision variable d thus provides a basis for selecting which of the two candidate pixels to draw. As discussed above, if the decision variable d[i] is positive at any particular step i, then the point $(x[i], y[i])=(x[i-1]+1, y[i-1]+1)$ is closer to the vector V3, and so that pixel is drawn. Conversely, if d is nonpositive, the pixel $(x[i], y[i])=(x[i-1]+1, y[i-1])$ is drawn.

Therefore by substitution, the following equalities describe the relationship between the decision variables d[i] and d[i+1]:

For d[i]>0 (i.e., a positive d):

$$y[i]=y[i-1]+1 \quad (11)$$

$$\rightarrow d[i+1]=d[i]+2(dy-dx) \quad (12)$$

For d[i]≦0 (i.e., a nonpositive d):

$$y[i]=y[i-1] \quad (13)$$

$$\rightarrow d[i+1]=d[i]+2dy \quad (14)$$

In the translated coordinate system, it follows by definition that for i=0 (i.e., when the stepping process commences at the origin (0,0)), both x[0] and y[0] are equal to 0. Therefore, from equation (7), in an X-major vector the decision variable d[init] for the first step away from the origin, i=1, is:

$$d[init]=d[1]=2dy-dx \quad (15)$$

For the selection of the initial pixel to be drawn, i.e., in the step i=1, the value d[1] defines the distance of the vector from the midpoint between the pixel (1,0) and the pixel (1,1). If this distance is positive, then the pixel (1,1) is drawn, otherwise the pixel (1,0) is drawn.

Drawing an X-major vector between two otherwise arbitrary points (x[a], y[a]) and (x[b], y[b]) then becomes a matter of performing successive calculations of d[i], x[i], and y[i]. This calculation is illustrated in the Pascal-like program statements shown in Appendix 1 (wherein each d[i], x[i], and y[i] is expressed as d, x, and y, respectively, and the alternative terms by which d is to be incremented at each step are expressed as e1 and e2, respectively).

It will be appreciated by those of ordinary skill that a typical implementation of this method would calculate the increment constants during setup, so that each step of the inner loop consists principally of a comparison and either an addition or an addition and an increment. The setup phase also requires nothing more than addition and subtraction. In addition, a typical implementation of this method would also deal with the case of x[a]>x[b] by complementing dx and decrementing x at each step, instead of incrementing it; would handle y[a]>y[b] by complementing dy and decrementing y at each step instead of incrementing it; and would handle $|dy|>|dx|$ by exchanging the roles of x and y.

L. Difficulties with Bresenham Algorithm

In the Bresenham method, if a vector passes exactly between two pixels, it is indeterminate which pixel should be drawn. Furthermore, it will be apparent that the drawing criterion is dependent upon endpoint order; i.e. which direction the vector is considered to be pointing. This dependence arises from the fact that at any ith step, if d[i]=0, the pixel drawn, e.g., for an X-major vector, is always (x[i−1]+1, y[i−1], i.e., the variable along the minor axis is always incremented in selecting a pixel when d[i]=0. This results in a different pixel being drawn if the stepping direction is up and to the right than if the stepping direction is down and to the left.

This inconsistency can lead to undesirable artifacts on the raster display. For example, if the same vector has occasion to be drawn twice, once in each direction, different pixels may undesirably be drawn each time.

M. Drawing Polygons

Generating the image of an arbitrary polygon typically entails breaking the polygon into scan lines and, for each scan line, (a) determining the points on the scan line that lie in the respective edges of the polygon, and (b) drawing pixels between those points to fill in the interlying region, e.g., in accordance with the X Window System. The result of this process is illustrated in FIG. 2.

II. SUMMARY OF THE INVENTION

In accordance with the invention, the drawing of a polygon is carried out as a process of treating the polygon as pairs of edges; determining the intersection of each of the edges with each scanline; and drawing appropriate pixels between each pair of edges. A novel decision variable for determining the horizontal distance of the polygon edge to the closest point is computed. By stepping along the edge in discrete increments and updating the decision variable at each step, the pixels closest to the true edge position are determined.

In plotting wide vectors in accordance with the invention, decision variables corresponding to each edge bounding the vector are computed. The decision variables take advantage of the fact that the slope of the edges are rational; therefore, an improved Bresenham-style algorithm adds integer values to the decision variable and compares it to zero. The initial value of the decision variable is irrational, but since only integers are added to it, it can be rounded to an integer without affecting the subsequent comparisons to zero. Each decision variable is based on the directed horizontal distance from an arbitrary point to the corresponding edge. By stepping along the edges in discrete increments and updating the decision variables at each step, the coordinates of the pixels closest to the true edge positions are determined. The decision variable is essentially insensitive to endpoint order and allows for computational efficiency.

For drawing a single-pixel-wide (SPW) vector in accordance with the invention, a decision variable is computed to determine the directed horizontal or vertical distance from an arbitrary point to an auxilary edge. The auxilary edge is positioned parallel to the vector and offset from the vector by one-half pixel width. By stepping along the edge in discrete increments and updating the decision variable at each step, the coordinates of the pixels closest to the true position of the vector are determined. These pixels are then drawn to plot the vector on the raster display. The decision variable is insensitive to endpoint order and allows for computational efficiency.

The computation operations in all of the foregoing drawing methods is advantageously performed in a reduced number of bits.

III. BRIEF DESCRIPTION OF THE DRAWINGS

Figure 9:
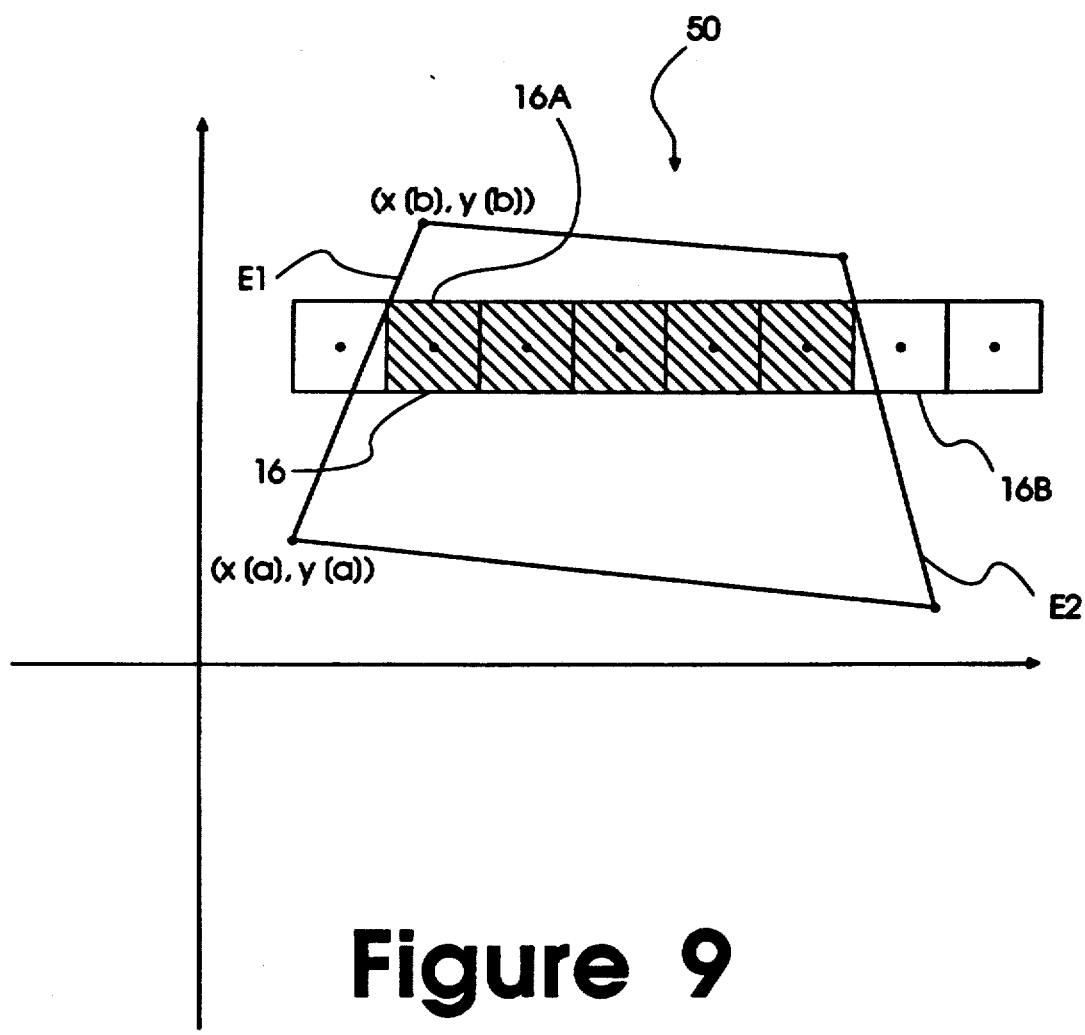
Figure 10:
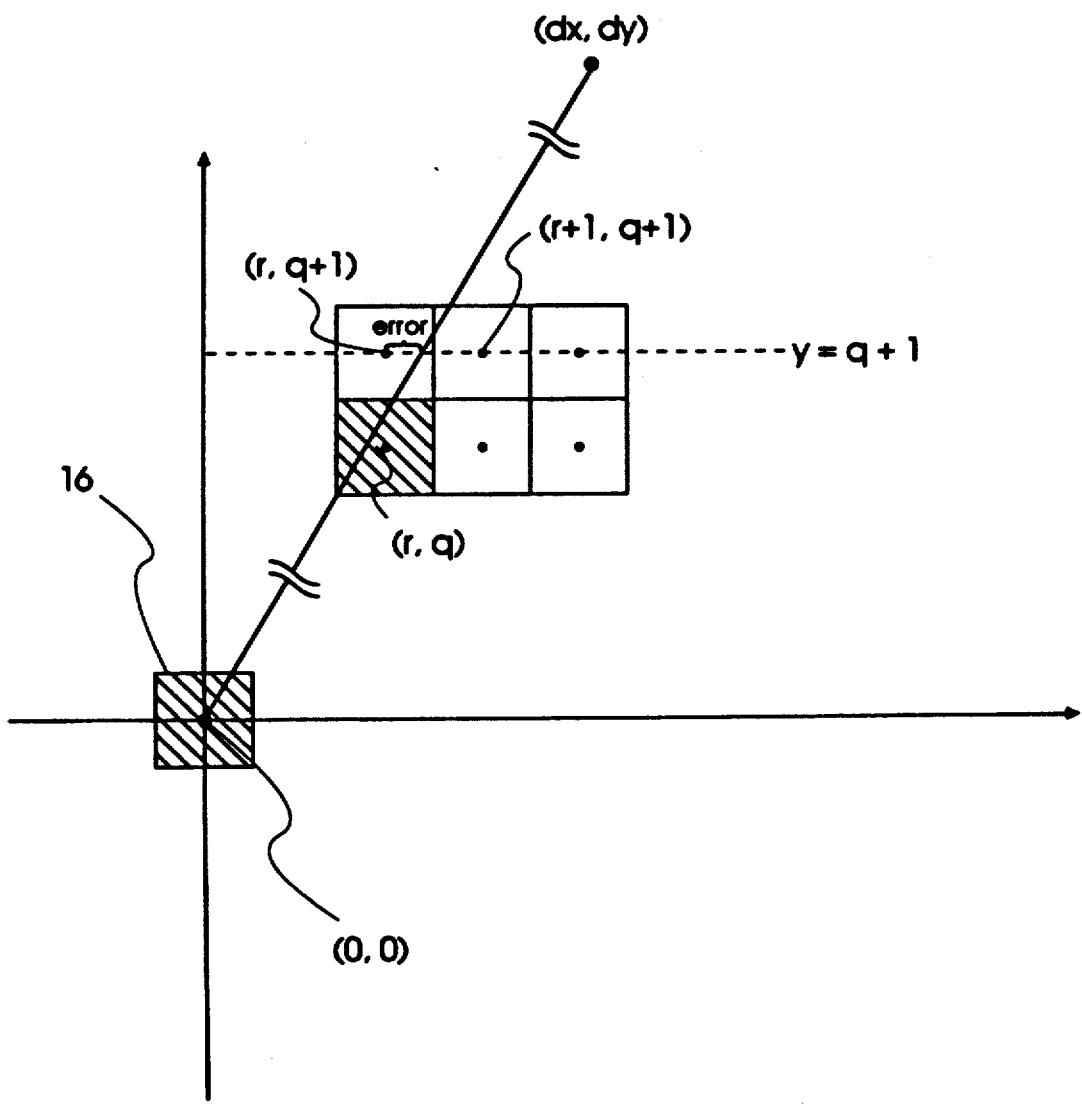
Figure 11:
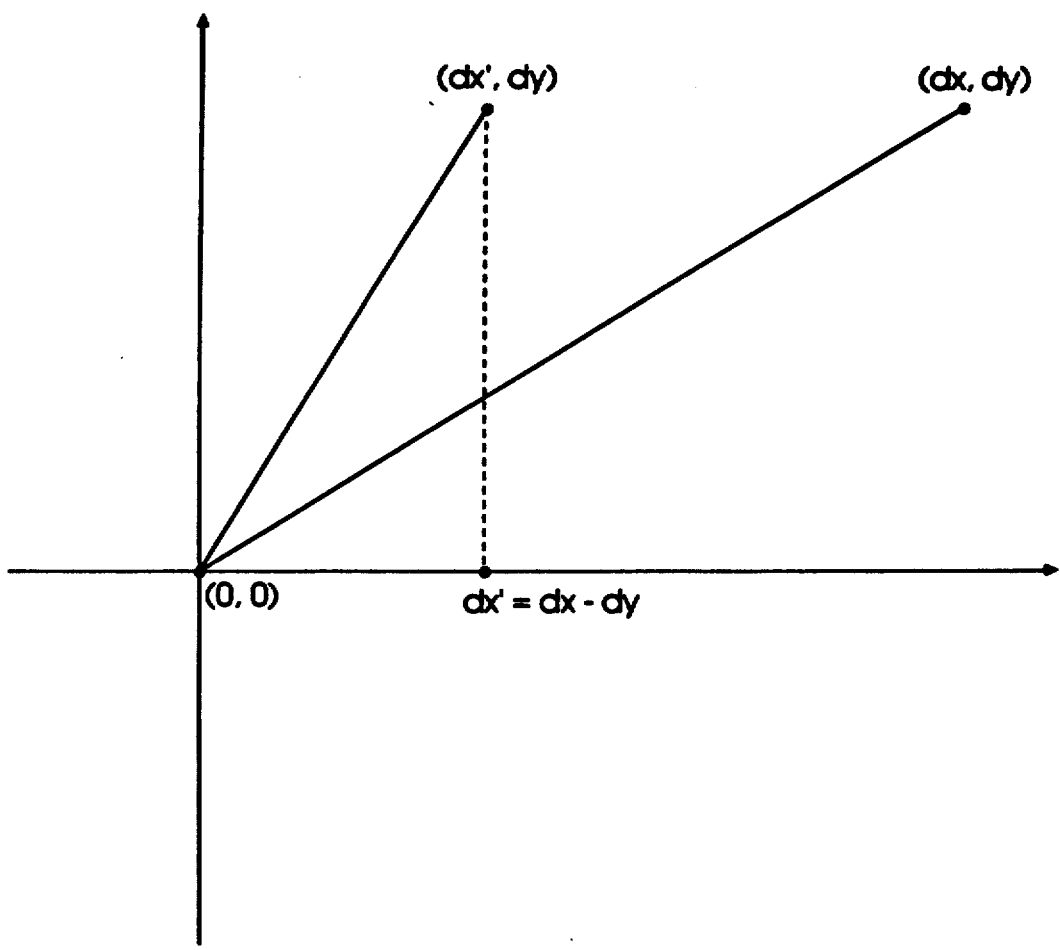

FIG. 9, 10, and 11 illustrate the determination of polygon edges.

Figure 12:
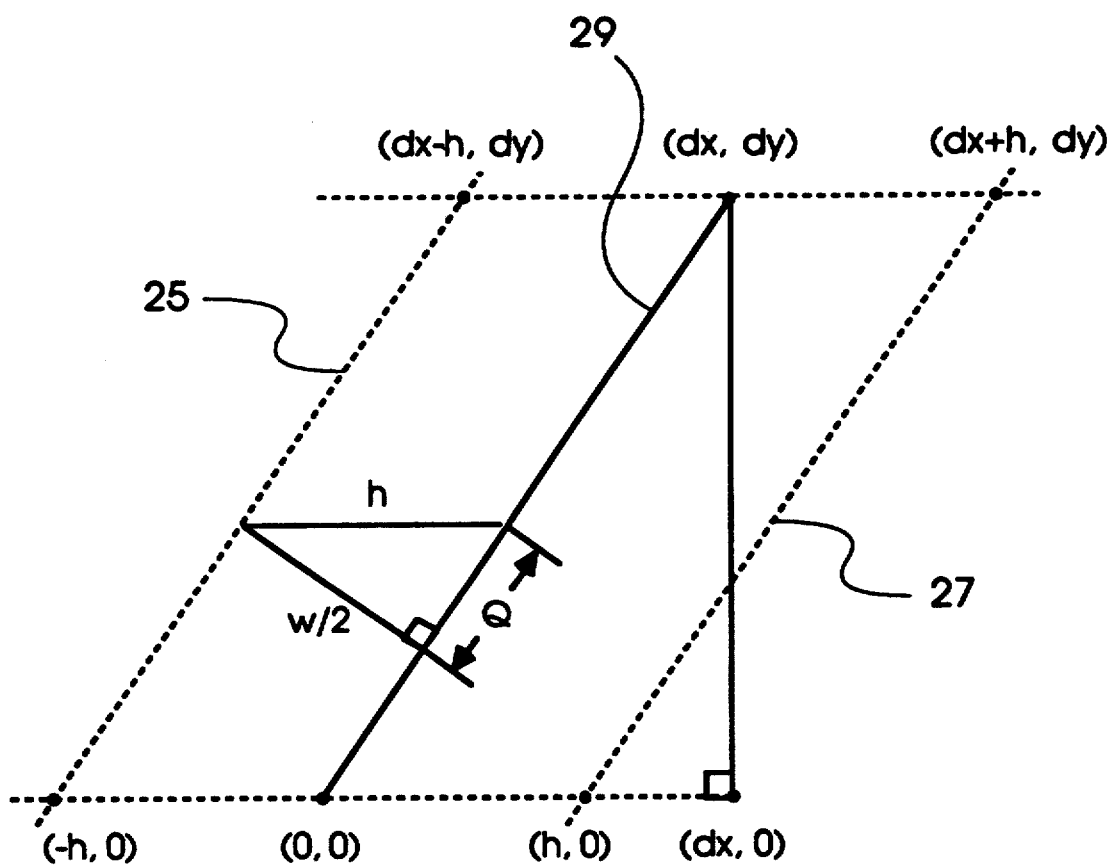

FIG. 12 illustrates a geometric relationship that bears on the determination of wide-line edges.

FIGS. 13-17 depict illustrative hardware that can be used to implement the drawing methods disclosed.

IV. DETAILED DESCRIPTION OF SPECIFIC EMBODIMENTS

1. Improved Computation of Polygon Edges

In accordance with the present invention, the basic approach of the Bresenham algorithm is adapted and improved for use in determining polygon edges.

1.1 Locating Polygon Edge Pixels

Referring to FIG. 9, assume that a left edge E1 of a polygon 50 extends from a point (x[a], y[a]) to another point (x[b], y[b]). Assume that the polygon 50 is to be drawn on a pixelized display 15 (not explicitly shown in FIG. 9). A right edge E2 forms another boundary of the polygon 50.

(It will be recognized by those of ordinary skill having the benefit of this disclosure that polygons can be much more complex, and can have several edges on a given scanline. The relatively simple case illustrated in FIG. 9 is used here for clarity.)

To be able to fill the polygon 50 under the Xwindow rules (described above) it is necessary, for each scanline, to find, and eventually to draw, the pixel 16A whose center (a) lies as close as possible to the left edge E1, and (b) is on or to the right of that edge. The pixel 16A delimits (and is included in) a left-to-right sequence of pixels 16 on the scanline in question that is to be drawn in filling the polygon 50, shown by cross-hatching in FIG. 9.

Likewise, it is also necessary to find, but not to draw, the pixel 16B whose center (i) lies as close as possible to the right edge E2, and (ii) is on or to the right of the edge E2. The pixel 16B delimits (and is included in) a left-to-right sequence of pixels on the scanline in question that is not to be drawn.

As in the basic Bresenham algorithm, the problem of finding the desired pixels 16A and 16B can be simplified by translating the polygon edge E1 or E2 into an edge from the point (0, 0), to another point (dx, dy).

For simplicity, assume a special case where the edge is Y-major, i.e., the edge's angle with respect to the horizontal is greater than 45 degrees but no greater than 90 degrees, that is, $0 \leq dx < dy$. (The more general case is examined below.)

Referring to FIG. 10, assume that the pixel (r,q) has just been selected as being the closest pixel on or to the right of the edge for the horizontal scanline containing r. The next pixel to be selected will then be either the pixel (r, q+1), or the pixel (r+1, q+1).

Consider the horizontal line defined by the equation y=q+1, i.e., the line that is one unit above the point (r,q). If the polygon edge passes through this line at a point (x,q+1), where $x \leq r$, then the next pixel to be selected is necessarily the pixel (r, q+1). Otherwise, the next pixel to be selected is the pixel (r+1, q+1).

Define the horizontal distance from the point (r, q+1) to the edge as the "error." If the point (r, q+1) is to the right of the edge, define the error as being negative; if the point is to the left of the edge, define the error as being positive; and if the point is on the edge, define the error as being zero.

If the error is positive, then the point (r, q+1) is to the left of the edge, and the pixel whose center is that point thus does not qualify for selection. Similarly, if the error is zero or negative, that point is on or to the right of the edge, and the pixel whose center is that point indeed qualifies for selection.

It will be apparent to those of ordinary skill (having the benefit of this disclosure) that the error for any horizontal scanline can be calculated by (a) subtracting 1 from the error for the previous scanline if (but only if) the pixel (r+1, q+1) was selected, and (b) adding the edge slope, which for the Y-major edge defined above is dx/dy.

Redefine q as y[i−1]; likewise, redefine r as x[i−1]. The above error calculation can then be expressed in an iterative fashion as follows:

$$\text{error}[i] = y[i-1] \cdot (dx/dy) - x[i-1] + (dx/dy) \quad (16)$$

which is equivalent to:

$$\text{error}[i] = i(dx/dy) - x[i-1] \quad (17)$$

As noted above, if error[i] is zero or less, then the pixel selected is the one containing (r, q+1), instead of the one containing (r+1, q+1). This implies that:

$$x[i] = x[i-1] \text{ if error}[i] \leq 0 \quad (18)$$

meaning that x (i.e., the minor-axis variable) is not incremented in selecting a pixel when the error is nonpositive; and $$x[i] = x[i-1] + 1 \text{ if error}[i] > 0 \quad (19)$$

meaning that x is indeed incremented in selecting a pixel when the error is positive.

1.2 Polygon-Edge Decision Variable

Since dy is assumed to be positive, both sides of equation (17) can be multiplied by dy without affecting signs. An improved, Bresenham-like decision variable d[i] (sometimes referred to as an "error term") can thus be defined:

$$d[i] = dy * \text{error}[i] \qquad (20)$$
$$= (i*dx) - (x[i-1])dy$$

Since dy is positive, equations (18) and (19) remain true when if d[i] is substituted for error[i] in those equations. Furthermore, equation (20) is true for any i, and thus for any i+1. Therefore, substituting d[i] for error[i] in equations (18) and (19), and subtracting d[i+1] from d[i], leads to:

$$d[i+1] = d[i] + dx \text{ if } d[i] \leq 0 \qquad (21)$$

and $$d[i+1] = d[i] + dx - dy \text{ if } d[i] > 0 \qquad (22)$$

For i=0, by hypothesis the origin of the vector is at the translated point (0,0); therefore:

$$x[0] = y[0] = 0 \qquad (23)$$

and so:

$$d[0] = 0 \qquad (24)$$

(It will be noted that the truth of equation (24) depends upon the assumption that each endpoint of an edge lies exactly at the center of a pixel. If subpixel positioning is utilized, this will not necessarily hold true. In the case of subpixel positioning, the polygon edge will be to the left of the initially selected pixel, so d[0] will have a negative value equal to dy times the error distance, per equation (20).)

Substituting equation (24) into equation (21) leads to the following value for d[1], which is used in pixel selection in the first step away from the origin:

$$d[1] = dx \qquad (24a)$$

meaning that for the first step away from the origin (0,0), the value of the decision variable is dx.

1.3 Basic Iterative Method for Locating Polygon Edge

Determining the edge between two otherwise arbitrary points (x[a], y[a]) and (x[b], y[b]) as shown in FIG. 9 thus becomes a matter of performing successive calculations of d[i], x[i], and y[i], in a manner reminiscent of the Bresenham method.

A basic iterative method exemplifying this calculation is illustrated in the Pascal-like program statements shown in Appendix 2. In the Appendix, each d[i], x[i], and y[i] is expressed as d, x, and y, respectively, and the initial value for d is d[1], i.e., dx.

It will be apparent to those of ordinary skill (having the benefit of this disclosure) that if d[0] is given the value of −1 instead of 0, then equation (21) is true if d[i] is less than 0 (instead of no greater than 0), and equation (22) is true if d[i] is at least 0 (instead of greater than 0). This adjustment to d[0] advantageously permits use of the sign bit of d[i] to determine which of those two equations to use in calculating d[i+1].

1.4 General Iterative Method for Locating Polygon Edge

The foregoing basic method assumes some special conditions, as stated above, namely that the slope of the edge is such that $0 \leq dx \leq dy$. The basic method also increments the y component by 1 at each step, and adds either 0 or 1 to the x component.

The basic method can be generalized by incrementing the x component by m or m+1 (instead of 0 or 1); by translating the endpoint (dx,dy) to a substitute endpoint (dx',dy'); and by biasing the initialization of the decision variable to a value d[1]; all as follows:

$$dy' = dy \text{ (or } |dy|; \text{ see below)} \qquad (25)$$

$$dx' = dx \text{ zmod } dy' \qquad (26)$$

$$m = dx \text{ zdiv } dy' \qquad (27)$$

$$d[1] = dx' \qquad (28)$$

A brief explanation of the variables listed above is presented here; a more detailed explanation of the derivation of these variables and their interrelationship is set forth below.

"ZMod" is defined as being a special form of the modulus operation; "zdiv" is defined as being the floor of the integer-division operation.

In the ordinary modulus operation, dx mod dy' is the remainder of division of dx by dy'. For example, in the ordinary modulus operation, 7 mod 3 = 1, since 7 divided by 3 equals 2 with remainder 1. Here, however, dx zmod dy' is defined as always being positive for a positive dy' (which condition is always true by definition per equation (25)).

In the zdiv operation, dx zdiv dy' is the floor, i.e., the integer result, of dividing dx by dy'. In the above example, 7 zdiv 3 = 2, but −7 zdiv 3 = −3.

Thus, for any variables a and b, the quantity a−(b * (a zdiv b)) is identically equal to (a zmod b), and is always positive by definition.

As used here, the following results obtain from equations (25) and (26):

$$dx \geq dy'*(dx \text{ zdiv } dy') \qquad (29)$$

$$dx = dy'*(dx \text{ zdiv } dy') + (dx \text{ zmod } dy') \qquad (30)$$

Thus, dx zmod dy' is always positive, and dx zdiv dy' always produces the floor of the result of the real-number division operation dx/dy', that is, dx zdiv dy' is the largest integer that is less than or equal to dx/dy'.

The final issue involves the y direction of the filling operation. If y[b] < y[a] for an edge, that implies that the filling operation is being performed from top to bottom. This may be done by simply decrementing y at every step instead of incrementing it and replacing dy with |dy|.

The general method makes it possible to step down the edges of a polygon, triangle, or vector, and to compute x positions on each scanline for filling the region that exactly satisfy the X Window System requirements. The method directly computes the starting and ending points of the half-open interval to fill for each scanline.

The accuracy of the method avoids the generation of visual artifacts that can be generated using prior methods. Such artifacts can include "holes," i.e., pixels that are not filled where two polygons meet at an edge, as well as overlaps where a pixel is drawn twice.

Appendix 3 shows an illustrative implementation of the general method. It will be noted that if dy is negative, then dy' is defined as being the absolute value of dy, which can be taken in the usual manner (e.g., by complementation); otherwise, dy'=dy. Since the sign of dy must be examined anyway to determine the orientation of the edge, it is often cheaper in terms of machine resources to take the absolute value only when dy is negative.

1.5 Derivation of General Polygon-Edge Determination Method

It may now be helpful to step back momentarily from the specifics of the general method to study its derivation. The general method arises from the fact that in the basic method, a Y-major edge was assumed, and dy was assumed to be positive. The basic method can be applied to edges that are drawn in the opposite direction, i.e., where dy<0, by replacing all references to dy in Appendix 2 with the absolute value of dy, $|dy|$, and by decrementing y instead of incrementing y for the stepping process.

Suppose, on the other hand, that the edge is such that dy <dx≦2dy. With a minor change, the basic iterative method is adaptable to this edge as well, by dealing with a substitute vector that is created by defining a new endpoint (dx',dy), shown in FIG. 11, such that:

$$dx' = dx - dy, \ 0 < dx' \leq dy \quad (31)$$

It can be shown that on any ith scanline, the substitute vector is exactly i pixels to the left of the original vector. Therefore, the basic iterative method can be applied to the substitute vector in lieu of the original vector, but with the pixel actually selected being i pixels to the right of the pixel called for by the basic method.

More generally, for any endpoint (dx,dy) whose y component is positive, dy>0, a substitute vector can be drawn using a new endpoint (dx',dy') as defined in equations (25) and (26). It can be shown that at any ith scanline, the distance between the substitute vector and the original vector is equal to (dx zdiv dy)*i.

It will be noted that in the special case of a Y-major edge discussed above, then the value of (dx zdiv dy) is equal to 0. This confirms that for Y-major edges, the general method is the same as the basic method, i.e., the basic method is a special case of the general method.

Again, the basic method can be applied to the substitute vector in lieu of the original vector, but with the pixel actually selected at any ith step being (dx zdiv dy)*i pixels to the right of the pixel called for in connection with the substitute vector.

Finally, the biasing of the initial value for the decision variable d is derived as follows.

As discussed above, under the X Window System polygon fill is performed between the leftmost pixel (min x) whose center is on or to the right of the lefthand edge, and the rightmost pixel (max x) whose center is to the left of the righthand edge, inclusive.

Consider first the lefthand edge. In the ordinary Bresenham method, the center of each pixel selected as a left edge boundary is by definition within ½ pixel either to the left or the right of the edge (otherwise another pixel would have been selected). This is not acceptable under the X Window System, which cells for each such pixel selected to have its center on or to the right of the edge; pixels whose centers are to the left of the edge are not candidates for selection.

If the initial value for the decision variable d is biased by being moved right (i.e., incremented) by ½ pixel, then each pixel chosen at the first and subsequent steps is indeed within 1 pixel to the right of the edge, instead of being within ½ pixel to the left or right of the edge.

With the ordinary Bresenham method for a Y-major vector, the decision variable d is initialized to 2dx'−dy' (see equation (15)). The decision variable d is by definition scaled by 2dy', that is, adding any quantity k to x results in adding 2k(dy') to d (see equation (7)).

It therefore follows that adding ½ a pixel (i.e., incrementing x by ½) to bias the initialized variable d is the same as adding 2*(½)*dy'. This addition cancels out the −dy' term in the Y-major form of equation (15).

Therefore, the correct biased initial value to use to ensure that selected pixels lie to the right of the left edge is simply 2dx', with 2dx' and 2dy'−2dx' being used as the error increment terms as they are in the ordinary Bresenham method.

Since the initial value of d, i.e., d[1], and all increment terms are multiples of 2, this factor of 2 can be divided out. Thus, dx' is used for d[1] and either dx' or dy'−dx' as increment terms.

Using the initially-biased decision variable d for both the left and right edges results in selecting pixels whose centers are on the edge or inside the polygon for the lefthand edge, and selecting pixels whose centers are on the edge or outside the polygon for the righthand edge. Therefore, the fill operation for any scanline is performed by drawing the pixel selected for the lefthand edge of the polygon; not drawing the pixel selected for the righthand edge, and drawing all pixels between them. If both edges select the same pixel, nothing is drawn.

In an actual implementation, when a polygon is being drawn (which operation involves determining pairs of edge points at each scanline as discussed above), two loops similar to that shown in Appendix 3 will be running essentially simultaneously, one for each edge.

1.6 Hardware Implementation

Figure 13:
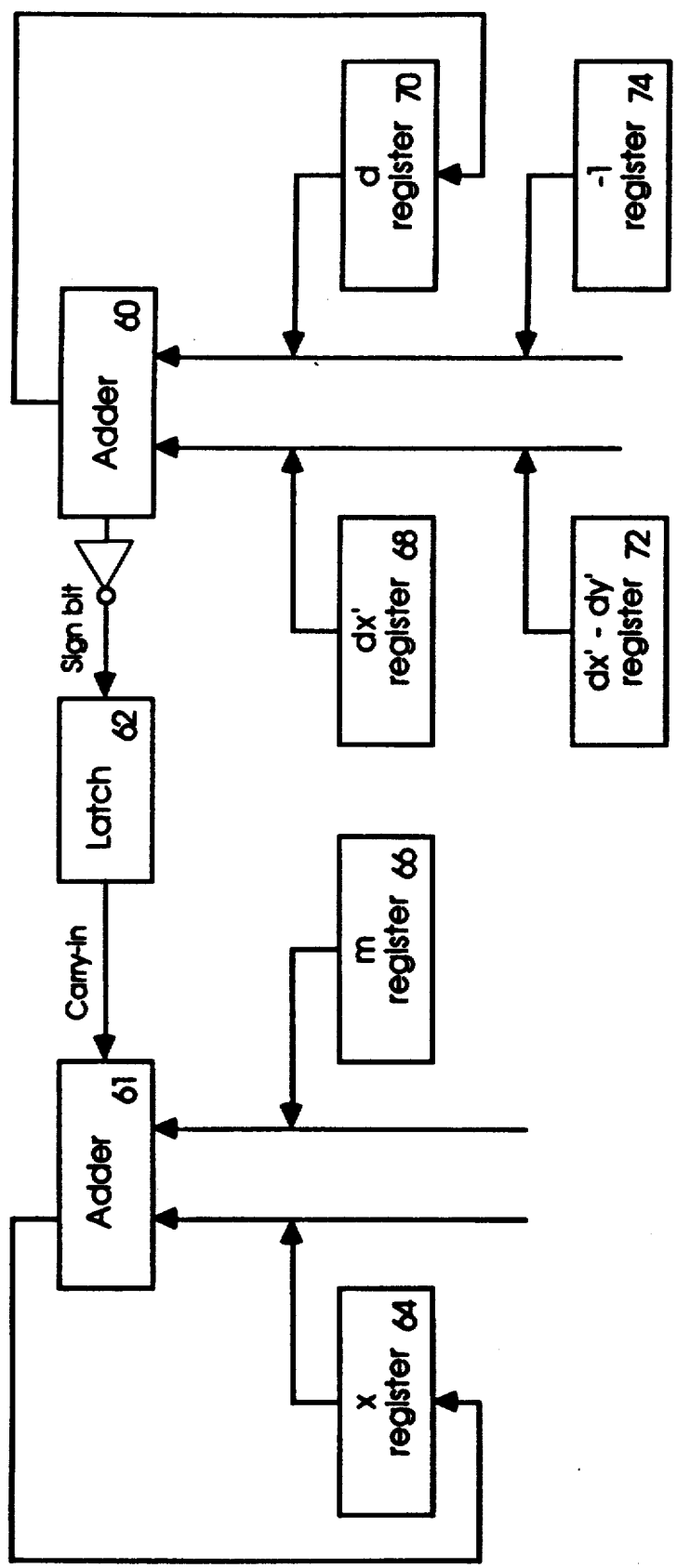

FIG. 13 depicts a high-level diagram of an illustrative hardware implementation of the polygon-edge determination method described above.

Figure 15:
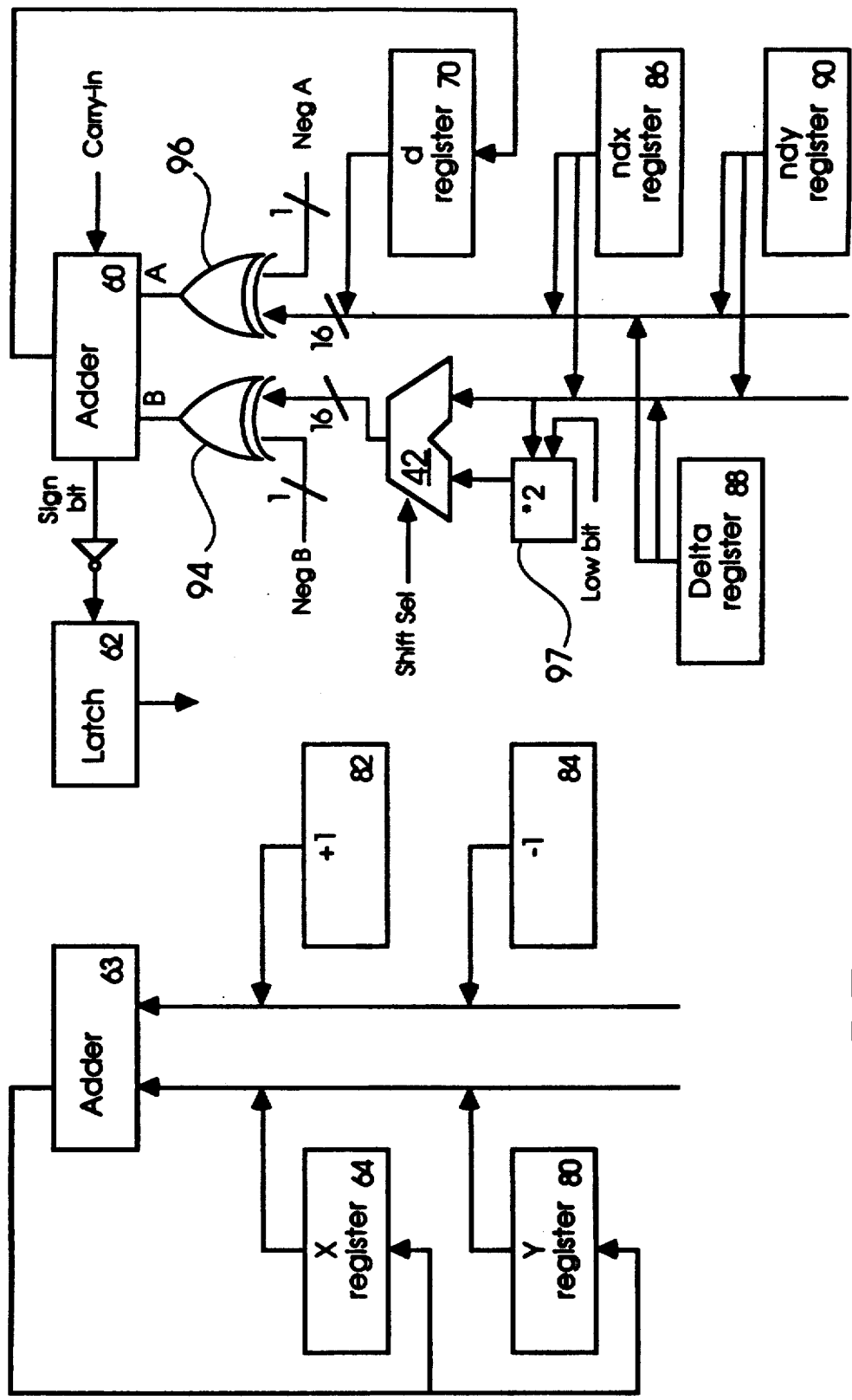
Figure 16:
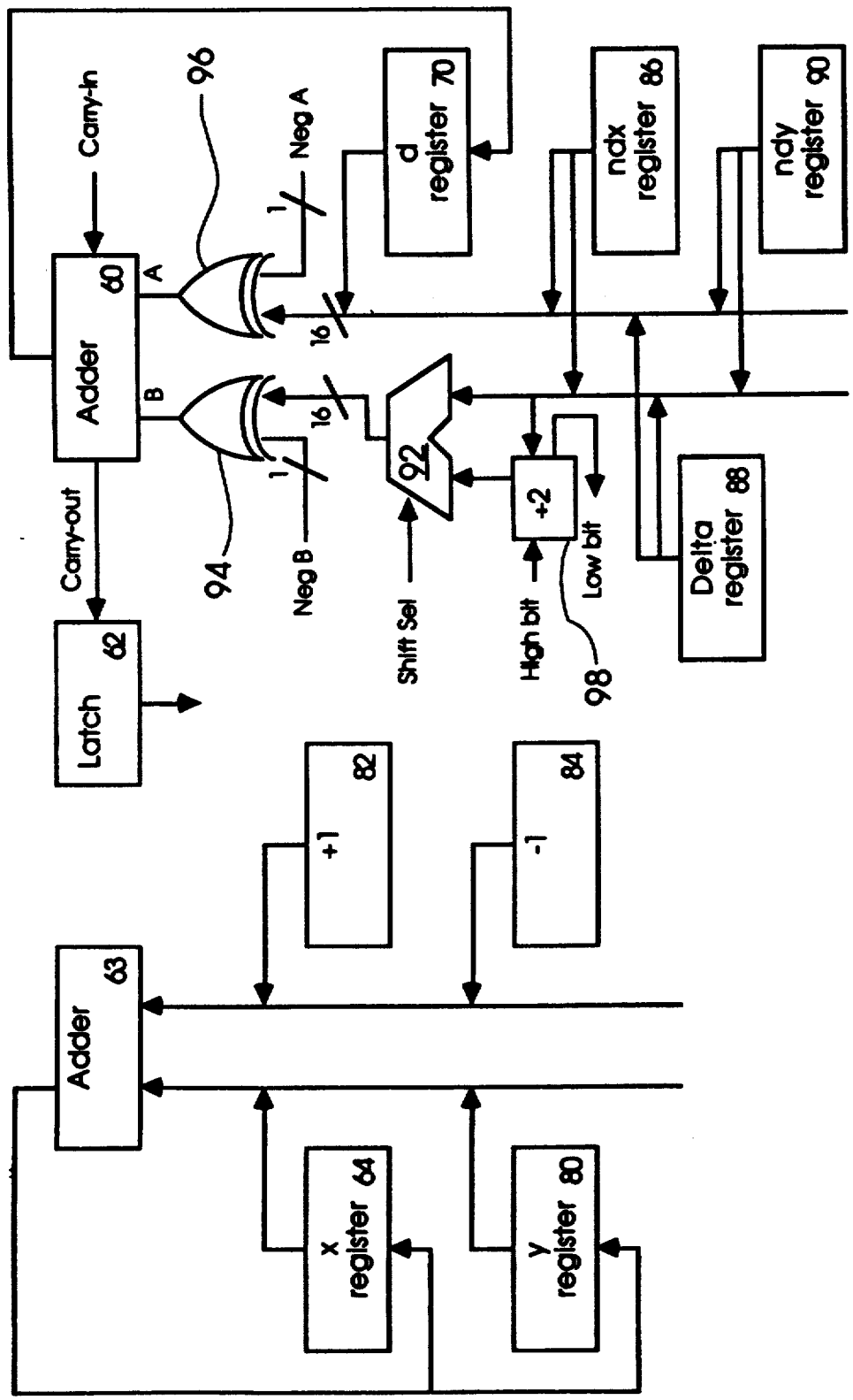
Figure 17:
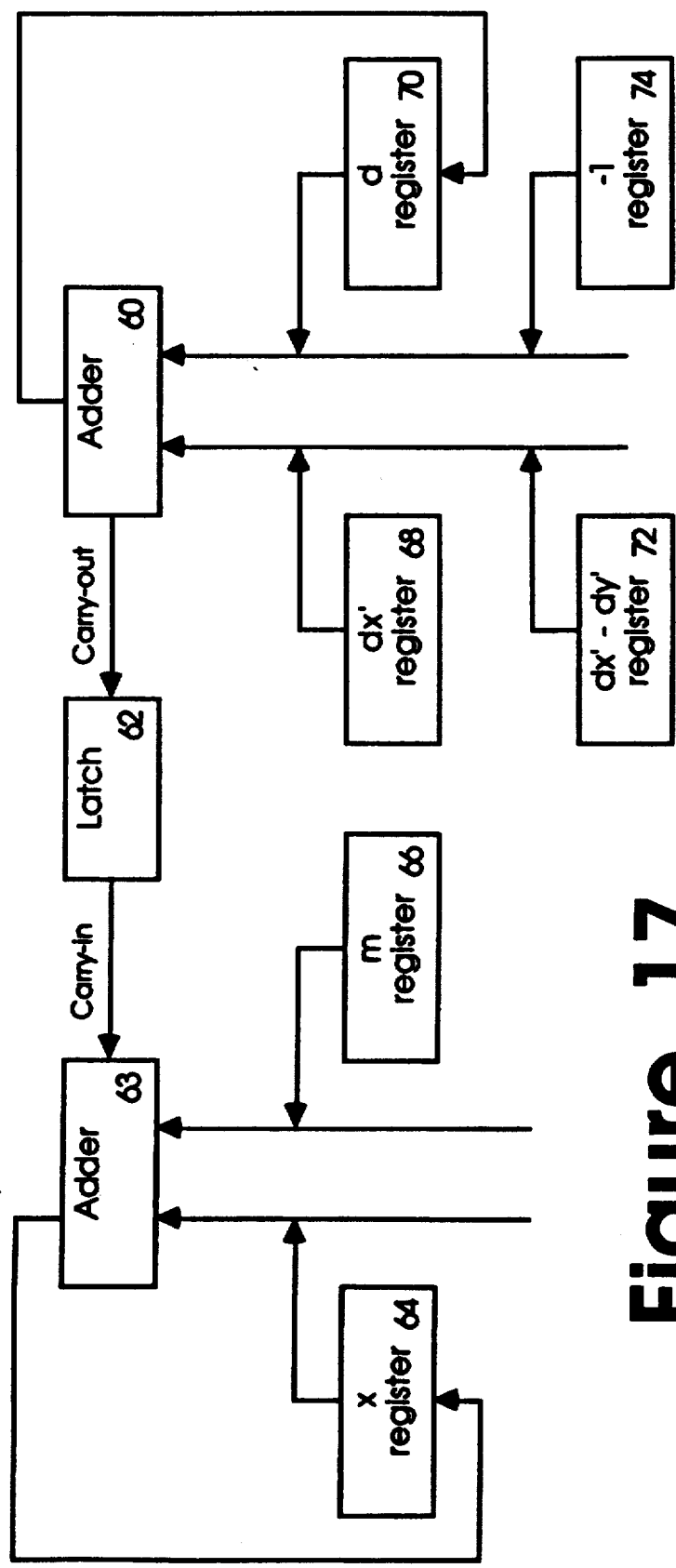

(For convenience, certain components common to the polygon-edge hardware and to the hardware implementations of other drawing methods are illustrated in FIG. 15–17.)

The discussion that follows relates to the operation of the hardware, for the purpose of illustrating to those of ordinary skill how actual drawing circuitry could be implemented.

Initially, a dx' register 68 and a dx'−dy' register 72 are assumed to have been loaded with initial values as described above. Alternatively, dx' and dy' can be provided, with the hardware computing dx'−dy'. A d register 70 is initially loaded by adding −1 to the dx' register 68.

The sign bit of the result from an adder 60 is complemented and latched for use in control logic (not shown). This value is used to select whether to add the contents of the dx' register 68 or the contents of the dx'−dy' register 72 to the contents of the d register 70.

This value is also used as the carry-in to an adder 61, which adds the contents of an x register 64 (which contains the value of x at any given time), and the m register 66 (which is initialized with the value of m). This implements the conditional (alternative) addition of the contents of the m register or of the m register plus 1 in a particularly simple way.

Referring to FIG. 15, a y register 80 is incremented on each edge step by either +1 or −1, depending on the drawing direction.

The three adders 60, 61, and 63 can be converted to two adders or one adder by performing the additions in sequence on the same adder instead of in parallel on different adders. In such a case, an AND gate must be included on the carry-in line to force it to zero except when m is being added to x.

Two sets of registers are required, one for each pair of polygon edges. The same adders can be used for both edges, however, if first one edge and then the other is computed.

2. Wide-line Edge Computations

Filling of a wide line under the X Window System in accordance with the invention is accomplished by finding the polygonal boundaries of the wide line and then applying the same rules as those for filling of polygons. This is a particular problem with wide lines, however. The problem stems from the fact that, although the width w is specified as an integral number of pixels, in general the horizontal width h, i.e., projection of the radius width w/2 onto the x axis, is an irrational number. This makes for an inconvenient, computation-intensive, and approximate process for determining the edges.

2.1 Preliminary Analysis

Referring to FIG. 12, consider a wide line defined by a width w, normal to a vector 29 that passes through the points (0,0) and (dx,dy). The wide line has a right edge 27 parallel to the vector 29 through the points (h,0) and (dx+h,dy), and a left edge 25 parallel to the vector 29 through the points (−h,0) and (dx−h dy), where dy and dx are integers, dy>0, and h is a positive real number.

For such a wide line, the width from (and normal to) the vector 29 to either edge is w/2; define the horizontal width h as the distance, parallel to the x axis, from the vector 29 to either edge. As illustrated in FIG. 12, it will be apparent, from the use of similar triangles that the ratio of the segment Q to w/2 is the same as the ratio of dx to dy. Q is thus equal to w/2 multiplied by dx/dy. Thus, from the Pythagorean theorem, the horizontal width h can be expressed as follows:

$$h\ 2 = (w/2)^2 + ((w \cdot dx)/(2 \cdot dy))^2 \quad (32)$$
$$= (w/2)^2 \cdot (1 + (dx/dy)^2) \quad (33)$$

For a wide line with dy>0, h is defined as negative for the left edge and positive for the right edge. Defining the function sqrt() as returning the positive square root of its argument, the following equalities obtain:

$$h = -(w/2) \cdot sqrt(1+(dx/dy)^2) \text{ [left edge]} \quad (34)$$

$$h = +(w/2) \cdot sqrt(1+(dx/dy)^2) \text{ [right edge]} \quad (35)$$

(The symbol ^ represents exponentiation, i.e., a b is a raised to the bth power.)

The edge through (h,0) and (dx+h,dy) can be expressed as the equation of a line through these two points by taking cross-product of the points, i.e., as a matrix which will be designated as L[y] to denote a Y-major vector:

$$L[y] = \begin{vmatrix} -dy \\ dx \\ dy \cdot h \end{vmatrix} \quad (36)$$

2.2 Decision Variable Using Improved Distance Metric

The dot product of the edge represented by the matrix L[y] and an arbitrary normalized point (x,y,1) in turn represents a distance metric between the edge and the point. This distance metric is zero if (x,y) is on the edge; positive if (x,y) is on the left side of the edge; and negative if (x,y) is on the right side of the edge (note that dy is positive).

Therefore, the dot product can be used to create a decision variable d that indicates which side of the edge the point (x,y) is on. Define d (sometimes referred to as an "error term") as being twice the dot product:

$$L\ dot\ (x,y,1) = d/2 \quad (37)$$

$$d/2 = y(dx) - x(dy) + dy(h) \quad (38)$$

Substituting equations (34) and (35), respectively, into equation (38) for the left and right edges, the following equalities obtain for the left edge:

$$d/2 = y(dx) - x(dy) - ((w/2) \cdot sqrt(dy^2 + dx^2)) \quad (39)$$

$$d = 2y(dx) - 2x(dy) - (w \cdot sqrt(dy^2 + dx^2)) \quad (41)$$

$$= 2y(dx) - 2x(dy) - sqrt((w^2) \cdot (dy^2 + dx^2)) \quad (42)$$

and the following equalities obtain for the right edge:

$$d/2 = y(dx) - x(dy) + ((w/2) \cdot sqrt(dy^2 + dx^2)) \quad (43)$$

$$d = 2y(dx) - 2x(dy) + (w \cdot sqrt(dy^2 + dx^2)) \quad (44)$$

$$= 2y(dx) - 2x(dy) + sqrt((w^2) \cdot (dy^2 + dx^2)) \quad (45)$$

As discussed above and illustrated in FIG. 9, to determine a polygon edge pair using these decision variables under the X Window System, the point must be selected on each scanline, for each edge, for which the value of d both (a) is as close as possible to zero, but still (b) is less than or equal to zero, i.e., the point must be either on, or as close as possible to the right of, the edge in question.

It will be noted that all of the terms in the equations (42) and (45) defining the decision variable d are integers except one, namely the respective square-root terms. Since the decision variable d is examined only to determine if it is less than or equal to zero, the square-root term can be appropriately rounded to an integer value without affecting the result of this inequality.

For example, suppose that in equation (42) the square-root term is a value p=1.534; denote the sum of the other terms on the right side of the equation as j, which by definition is an integer. Suppose that j=1; then j−p is −0.534, which is less than zero. Rounding p down to 1 leaves the inequality unchanged, since 1−1≦0. Therefore, if j−p≦0, it follows that j−floor(p)≦0.

Similarly, in equation (45) the square-root term that is added to the integer terms can be rounded up without affecting the comparison between d and zero: if j+p is less than or equal to zero, then necessarily j+ceiling(p) is likewise no greater than zero.

Therefore, the following equation can be substituted in place of equation (42) for the left edge:

$$d = 2y(dx) - 2x(dy) - floor(sqrt((w^2)*(dy^2 + dx^2))) \quad (46)$$

and the following equation can be substituted in place of equation (45) for the right edge:

$$d = 2y(dx) - 2x(dy) + ceiling(sqrt((w^2)*(dy^2 + dx^2))) \quad (47)$$

2.3 Method Using Improved Decision Variable

The decision variable d can be used to step along the wide-line edge in much the same manner as described for polygon edges. Each incrementation of y by 1 results in adding 2dx to d. The problem is then to find the value by which to increment x so that x is no greater than zero.

The general method of determining a polygon edge is adapted to this end (see equations (25) through (30) and accompanying text). Appendix 4 shows an illustrative implementation of such an adaptation. It extends to cases in which dy<0 in the same manner as polygons, i.e., by replacing dy with the absolute value of dy and by decrementing dy at each step instead of incrementing it.

The wide-line method takes advantage of the fact that the slopes of the wide line edges are rational (since the endpoints of the defining vector are constrained to fall on the pixel grid). It thus advantageously provides a way to fill a wide-line segment exactly, despite the fact that the vertices of the wide-line segment may be at irrational positions.

For the same reason, the method is applicable when line segment endpoints are not coincidental with pixel centers: even when subpixel positioning is used to define endpoints, using fixed-point values for the vector coordinates, the slopes of the line segments are still rational, meaning that the method disclosed above is useful.

The wide line method is also relatively fast, because it requires only integer operations except for taking a single square root to integer precision. No fixed point or floating point operations are required.

Because the method uses a Bresenham-like approach, it can be adapted for execution on virtually any special-purpose Bresenham edge-drawing hardware that allows specified values of d, dx, and dy to be loaded.

2.4 Locating Vertices of Wide Lines

The above analysis does not indicate how to find the vertices of the wide line polygon, nor how to find the correct starting pixels for the fill operation. This can be accomplished by finding the y position of each polygon vertex.

The vertices are of course defined as the point of intersection of pairs of intersecting polygon edges. Any vertex is defined by the cross product of the two line equations defining the intersecting edges.

A vertex is not necessarily located at a pixel center, i.e., it is not necessarily defined by integer coordinates. Nonetheless, the proper pixel for selection can be obtained by (a) determining the x and y coordinates of the vertex by taking the cross-product of the edges in question in accordance with conventional coordinate-geometry principles, (b) rounding the x and y coordinates up to the next respective integer values. Edges of wide lines should be drawn such that the scanline containing the vertex with the larger y value is not drawn. That way, the X Window System polygon fill rules are satisfied and scanlines are never drawn twice. The rounded values of x and y are used in computing the initial values of d in equations (42) and (45).

Once all edges have been defined, the wide line may be completed by performing standard polygon-filling operations, e.g., as described in the X Window System specification.

2.5 Wide Line Ends

Figure 1:
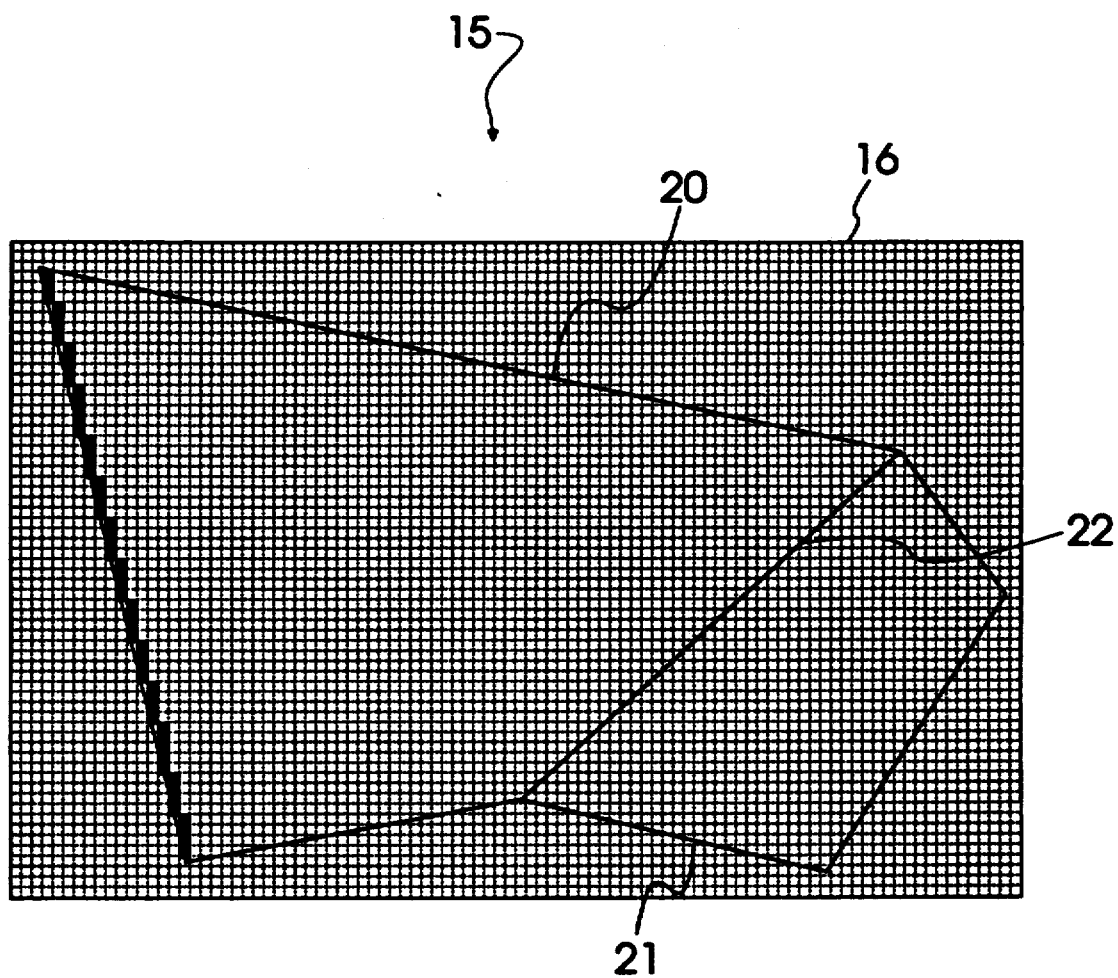
FIG. 1 depicts a display subdivided into pixels, upon which is superimposed two polygons having a common edge. A left edge of one polygon is shown as having the associated pixels drawn.
Figure 2:
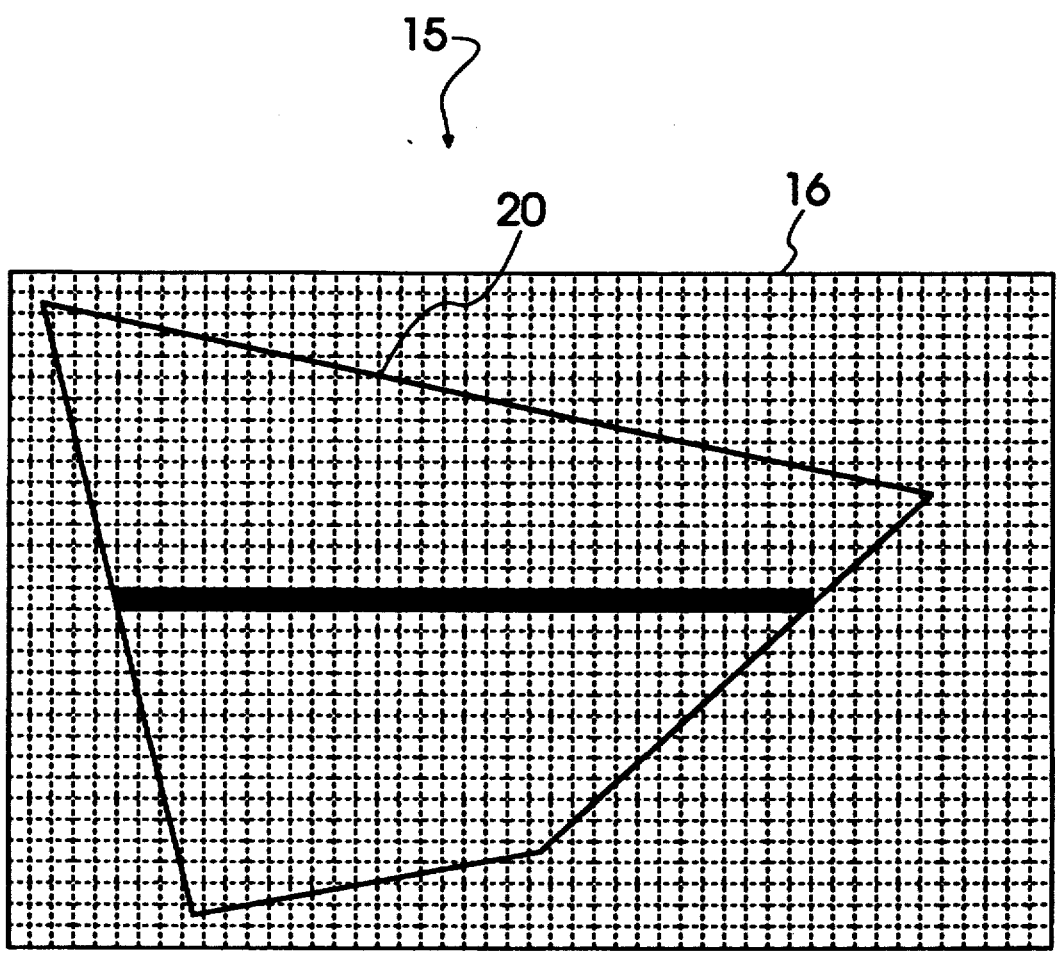
FIG. 2 shows a pixelized display in which one scanline is filled between edges of a polygon.
Figure 3:
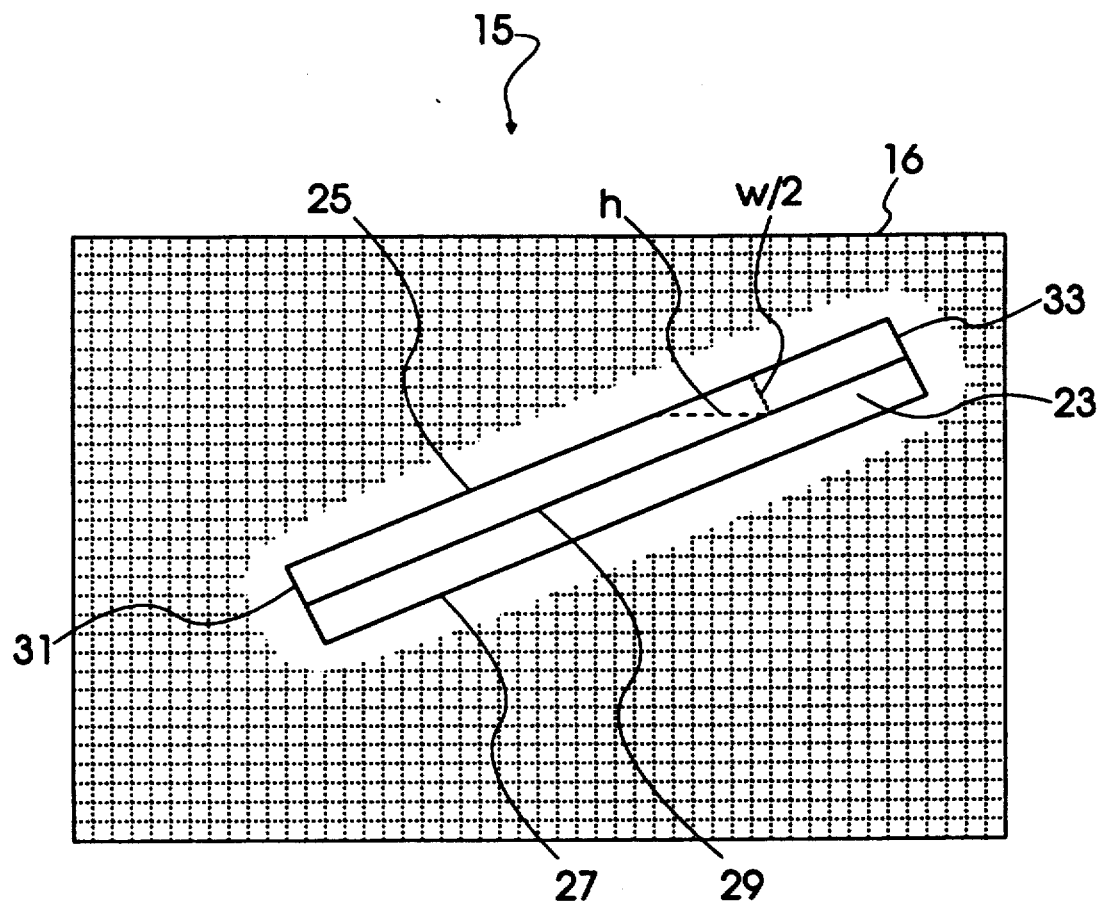
FIG. 3 depicts a wide line superimposed upon a pixelized display.
Figure 4:
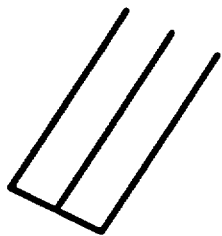
FIG. 4 shows common end- and cap styles for wide-line vectors under the X Window System.
Figure 4:
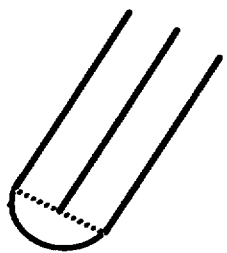
Figure 4:
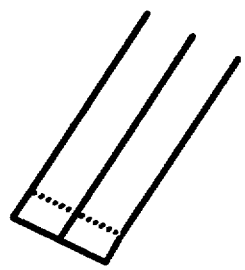
Figure 4:
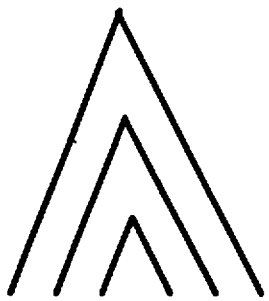
Figure 4:
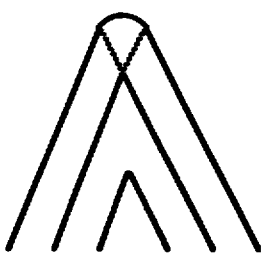
Figure 4:
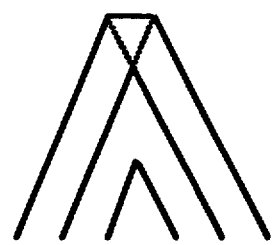
Figure 5:
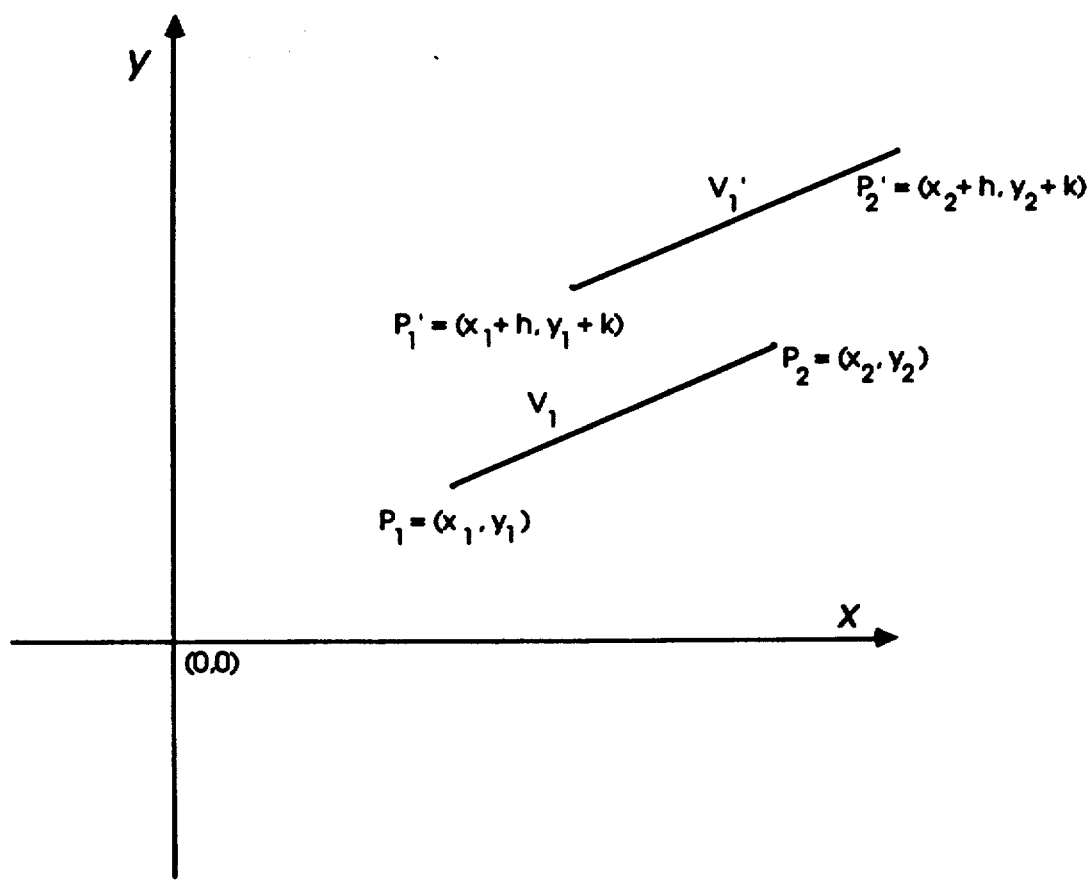
FIG. 5 illustrates a translation-invariant property required under the X Window System.
Figure 6:
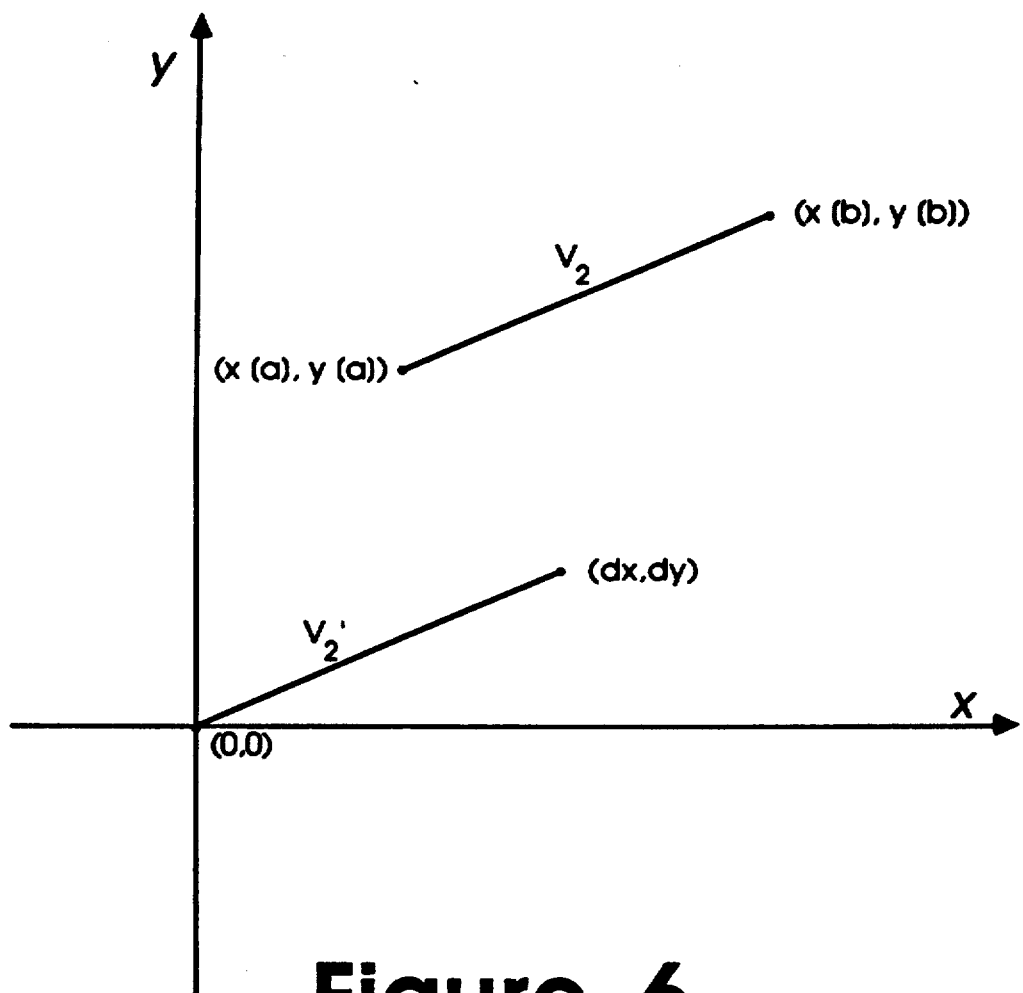
FIG. 6 shows an an X-major vector translated to (0,0), (dx,dy) form.

The above analysis relates specifically to converting a wide line to a polygon for purposes of determining its edges in connection with the drawing process. The same analysis applies to the miter join style, butt cap edges, projecting cap edges, and edges due to dash patterns. FIG. 4 illustrates the cap and join styles. The cap edges and dash edges are merely edges at a 90 degree rotation to the vector defining the wide line, at offsets from one or the other vertex that are computed in the same way that h is computed from w above. The method for determining wide line edges can thus be adapted for use with these other edges.

2.6 Hardware Implementation

Figure 14:
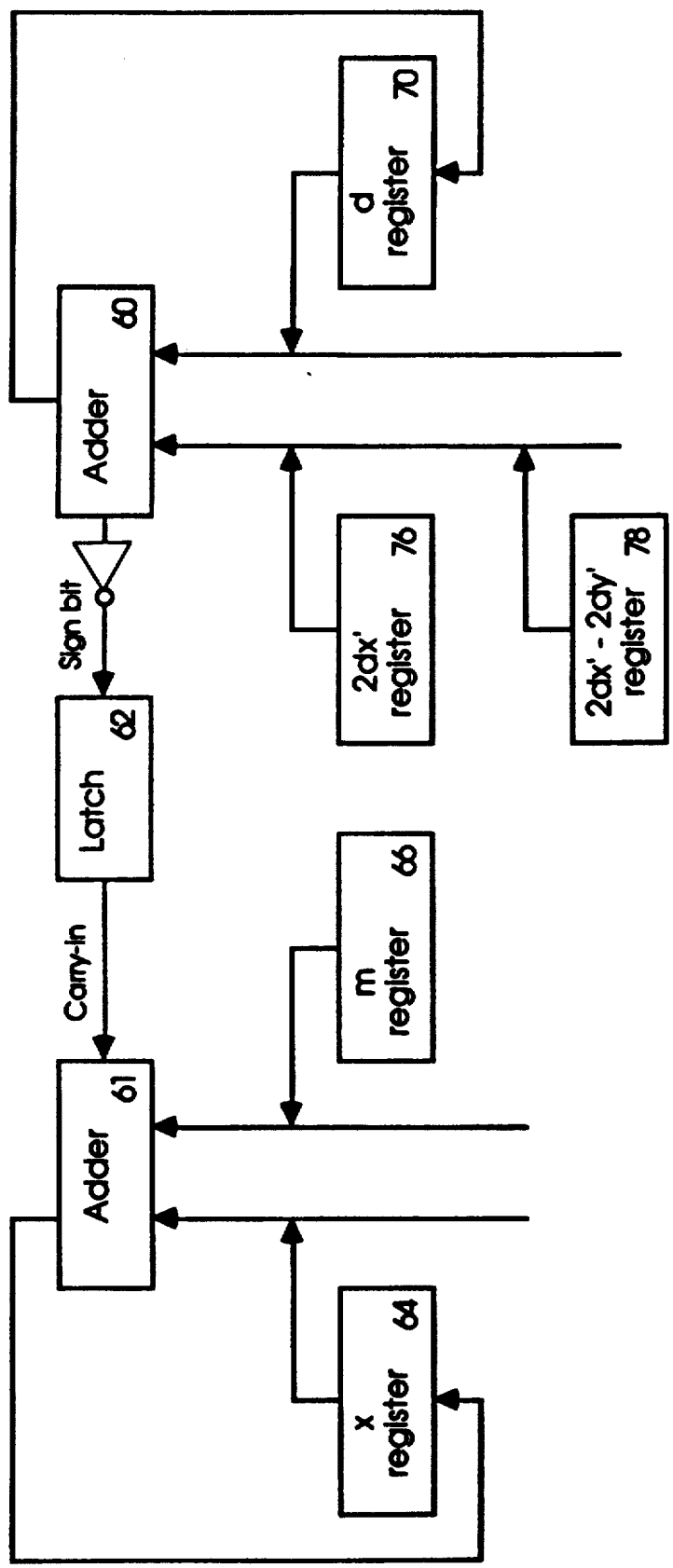

FIG. 14 depicts a high-level diagram of hardware for implementing the wide-line drawing method described above.

The discussion that follows relates to the operation of the hardware, for the purpose of illustrating to those of ordinary skill how actual drawing circuitry could be implemented.

It will be noted that the wide-line hardware shown in FIG. 14 is very similar to the polygon hardware depicted in FIG. 13. It differs in that 2dx' and 2dx'−2dy' are loaded into the registers 76 and 78, respectively, instead of dx' and dx'−dy' being loaded into the registers 68 and 72. In addition, the d register 70 is initially loaded with a computed value involving a square root (see equation (46) and (47) and Appendix 4). The square-root computation can be conventionally performed using a lookup table or other technique known to those of ordinary skill.

3. Improved Single-pixel-wide Vector Drawing

A method of drawing single-pixel-wide (SPW) vectors in accordance with the invention advantageously satisfies the X Window System requirements for drawing polygons.

3.1 Stepping Along Single-Pixel-Wide (SPW) Vectors

An SPW vector can usefully be treated as polygon with a width of one pixel as measured in the minor axis direction, rather than perpendicular to the vector. The wide-line stepping method described above, which is based on the general method for determining polygon edges, can itself be adapted for drawing SPW vectors.

As discussed in detail above and illustrated in FIG. 12, in drawing a wide line, the goal at each scanline is to select the pixel on that scanline that is on or to the right of the wide-line edge. The edge's position is defined as a vector through the points (h,0) and (dx+h,dy), where dx and dy are integers, dy>0, and h is the horizontal offset of the edge from the vector centerline, in either direction. (See generally equations (32) through (34) and accompanying text.)

For a vector that is a single pixel wide, the value of h is either $\frac{1}{2}$ or $-\frac{1}{2}$. Drawing the vector entails drawing all pixels between the two edges defined by $h = +\frac{1}{2}$ and $h = -\frac{1}{2}$, i.e., exactly one pixel per scanline.

It will be apparent to those of ordinary skill (having the benefit of this disclosure) that both edges need not be computed; a stepping-type drawing method need only step along one of the edges.

If the stepping process steps along the left edge, the pixel to be drawn at each scanline is the closest pixel that is on or to the right of that edge. Conversely, if the stepping process steps along the right edge, the pixel to be drawn at each scanline is the closest pixel that is to the left of, but not on, that edge.

Thus, if dy is positive, then h is negative for the left edge and positive for the right edge; and vice versa if dy is negative.

3.2 Improved SPW Decision Variable

An improved decision variable d (also referred to as an "error term") for the SPW vector arises as a special case of the wide-line decision variable. It will be recalled that this decision variable utilizes the dot-product operation to measure the distance between a pixel and the wide-line edge, instead of the conventional Bresenham approach to this measurement.

Equation (38), above, defines the result of the dot product operation for a wide line. Since the value of h for the SPW vector equals plus or minus $\frac{1}{2}$, this value can be substituted into the equation (38) as follows:

$$d = 2y(dx) - 2x(dy) - dy \text{ [left edge]} \quad (48)$$

$$d = 2y(dx) - 2x(dy) + dy \text{ [right edge]} \quad (49)$$

An SPW vector can be drawn using either of these decision variables, selecting either (a) pixels that are on or to the right of the left edge or (b) pixels that are to the left of the right edge. The decision variables are positive by definition for points to the left of an edge and negative for points to the right of an edge.

Therefore, for a Y-major vector, the SPW vector can be drawn using either of the following two inequalities (the second form of the right-edge inequality is equivalent to the first):

$$0 \geq d = 2y(dx) - 2x(dy) - dy \text{ [left edge]} \quad (50)$$

$$0 < d = 2y(dx) - 2x(dy) + dy \text{ [right edge]} \quad (51)$$

$$0 > -d = -2y(dx) + 2x(dy) - dy \text{ [right edge]} \quad (52)$$

(A Y-major vector will be assumed in this SPW discussion until noted otherwise.)

3.3 Left Edge-Stepping Method for SPW Vectors

For the left edge, i.e., the edge having lesser x values, stepping along the edge is exactly like stepping along a polygon or wide-line edge, discussed above. At each step, the decision variable d is computed for the point P=(x+(dx zdiv dy), y+1), assuming that dy>0.

If the computed d is positive, then the center of the pixel P in question is left of the left edge. That pixel is consequently not a candidate for drawing, and the proper pixel to be drawn is the pixel P+(1,0) just to its right.

Therefore, the x component of the point is incremented by 1 to select and draw the pixel P+(1,0); the x component has been incremented by 1, and so 2dy is subtracted from d to preserve the equality of equation (50).

3.4 Right Edge-Stepping Method for SPW Vector

For the right edge, the edge-stepping process is different from stepping along a polygon edge. For a polygon edge, the X Window System calls for selecting (but not drawing) the pixel whose center is on the right edge or as close as possible on the right of the right edge. But for drawing an SPW vector, the standard calls for drawing the pixel whose center is as close as possible to the left side of the right edge without being on the edge.

This means that in stepping along the right edge of the SPW vector, at each step the decision variable d must be computed for the point (x+1+(dx zdiv |dy|), y+1), which is the rightmost of the pair of points that is guaranteed to bracket the right edge on the scanline in question.

If d is positive for that point (as required by equations 51) and (52)), then the center of the pixel P containing that point in fact lies to the left of the SPW vector and should therefore be drawn.

On the other hand, if d is nonpositive, then the proper pixel to be drawn is just to the left of the pixel P. Consequently, 1 is subtracted from x to select and draw the pixel P−(1,0); 2dy is added to d to preserve the equality of equation (52).

3.5 Computational Effect of Variations in dx and dy

An inspection of the signs and relative absolute values of dx and dy in selecting an edge-stepping approach (right edge or left edge) can result in computational conveniences. Two of the eight possible cases are described below in detail; treatment of the remaining six cases will be apparent to those of ordinary skill having the benefit of this disclosure.

Consider first the case in which both dx and dy are greater than zero and dy is greater than dx; in other words, the SPW vector is a Y-major vector in the first quadrant.

In this case, (dx zdiv |dy|) is equal to zero. Stepping along the left edge moves from point (x,y) to the point (x,y+1), and adds 2dx to d; if d is greater than zero, then x is incremented to select a pixel and 2dy is subtracted from d. This, of course, is the usual Bresenham method for Y-major vectors.

A second case occurs when 0<−dx<dy, i.e., the vector is a Y-major vector in the second quadrant. In this case, (dx zdiv |dy|)=−1. Stepping along the left edge thus moves from point (x,y) to point (x−1,y+1).

In this second case, stepping along the right edge instead of the left edge results in moving from point (x,y) to the point (x, y+1). This is more computationally convenient, and so in this second case the right edge is selected for stepping.

Operating in this manner, each time y is incremented by 1, 2dx must be added to d to preserve the equality of equation (51). Likewise, if $d \leq 0$, x must be decremented by 1 to select the proper pixel for drawing, meaning that 2dy must be added to d.

The second form of right-edge inequality, as shown in equation (52), can advantageously be used for computation. Instead of computing d, compute $-d$. Then each incrementation of y adds $-2dx$ to d, which is equal to $2|dx|$ (since $dx<0$). The condition for decrementing x is now $0 \leq d$; when this condition is satisfied and x is decremented, $-2dy$ is added to d.

This approach to computation results in a stepping method that is close to the Bresenham method, but significantly different: the value of x is changed when $0 \leq d$ or when $0<d$, depending on the vector orientation.

The significance of the difference lies in the fact that when d is equal to zero, the edge passes exactly through a pixel center, meaning that the SPW vector passes exactly between a pair of pixels. The ordinary Bresenham's algorithm is assymetrical: depending on whether the minor-axis component is being incremented or decremented, the pixel to the left or right of the vector is selected.

In the present method, therefore, the case where $d=0$ is treated differently depending on the sign of dx and on whether the vector is X-major or Y-major. The present method is thus advantageously symmetrical: the same pixels are drawn no matter which direction is chosen for edge-stepping.

The present method advantageously satisfies, without the need for specially designed hardware, the X Window System requirement for polygons, namely that a pixel whose center is exactly on an edge is included with pixels whose centers are to the right of the edge.

3.6 General SPW Drawing Method

The method described for plotting SPW vectors of Y-major orientation with $dy>0$ can be readily generalized to apply to vectors of other orientations. For example, if $dy<0$, the value of dy is replaced by the absolute value of dy, and dy is decremented at each step instead of incremented, as described above for polygons and wide lines.

X-major SPW vectors are 1 pixel high in the y direction, as opposed to 1 pixel wide in the x direction. The edge through the points (0,h) and (dx, dy+h) can be expressed as the cross-product of those points, namely a matrix L[x]:

$$L[x] = \begin{vmatrix} -dy \\ dx \\ -dx \cdot h \end{vmatrix} \quad (53)$$

It will be noted that the matrix L[x] for X-major vectors is similar to the matrix L[y] for Y-major vectors except for the $-dx(h)$ term, which is $dy(h)$ in the matrix L[y]. Taking the dot product of this matrix and a normalized point (x,y,1) yields an equation almost identical to that for Y-major vectors (see equations (37) and (38)).

If the dot-product result is positive, the point (x,y) is counterclockwise from the vector; if the result is negative, the point is clockwise from the vector; and if the result is zero, the point is on the vector.

The dot-product computation equations for both X-major and Y-major vectors are set forth below. For X-major vectors:

$$L[x] \text{ dot } (x,y,1) = d/2 = y(dx) - x(dy) - dx(h),$$

and since h will be equal to either $+0.5$ or $-0.5$:

$$d = 2y(dx) - 2x(dy) - +dx \quad (54)$$

And for Y-major vectors:

$$L[y] \text{ dot } (x,y,1) = d/2 = y(dx) - x(dy) + dy(h),$$

and likewise, since $h = +-0.5$:

$$d = 2y(dx) - 2x(dy) + -dy \quad (55)$$

It will be seen that eight possible cases of SPW vectors exist: the vector being either an X-major or a Y-major vector, with h being either $+0.5$ or $-0.5$, and with d being either positive or negative.

Figure 7:
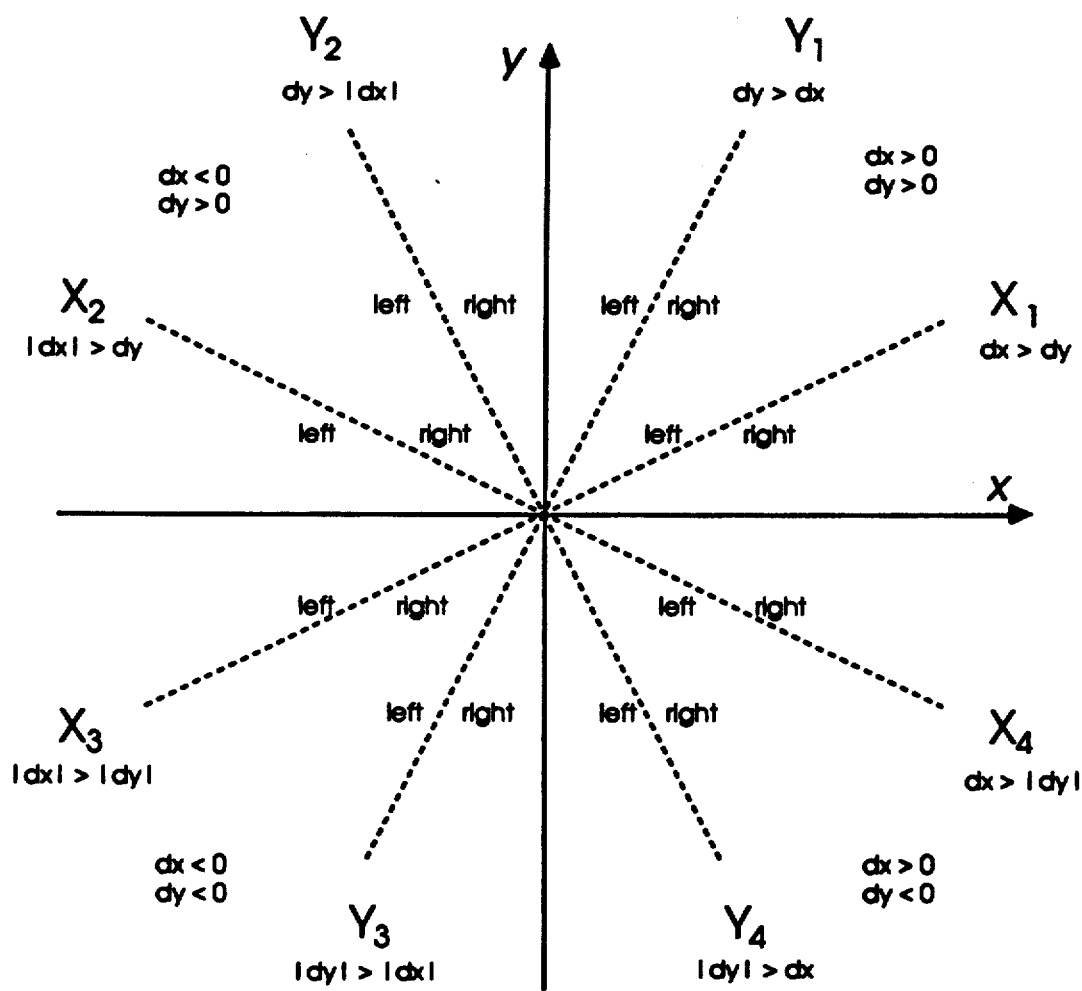
FIG. 7 depicts X-major and Y-major vectors in each of the four quadrants of the Cartesian coordinate system.
Figure 8:
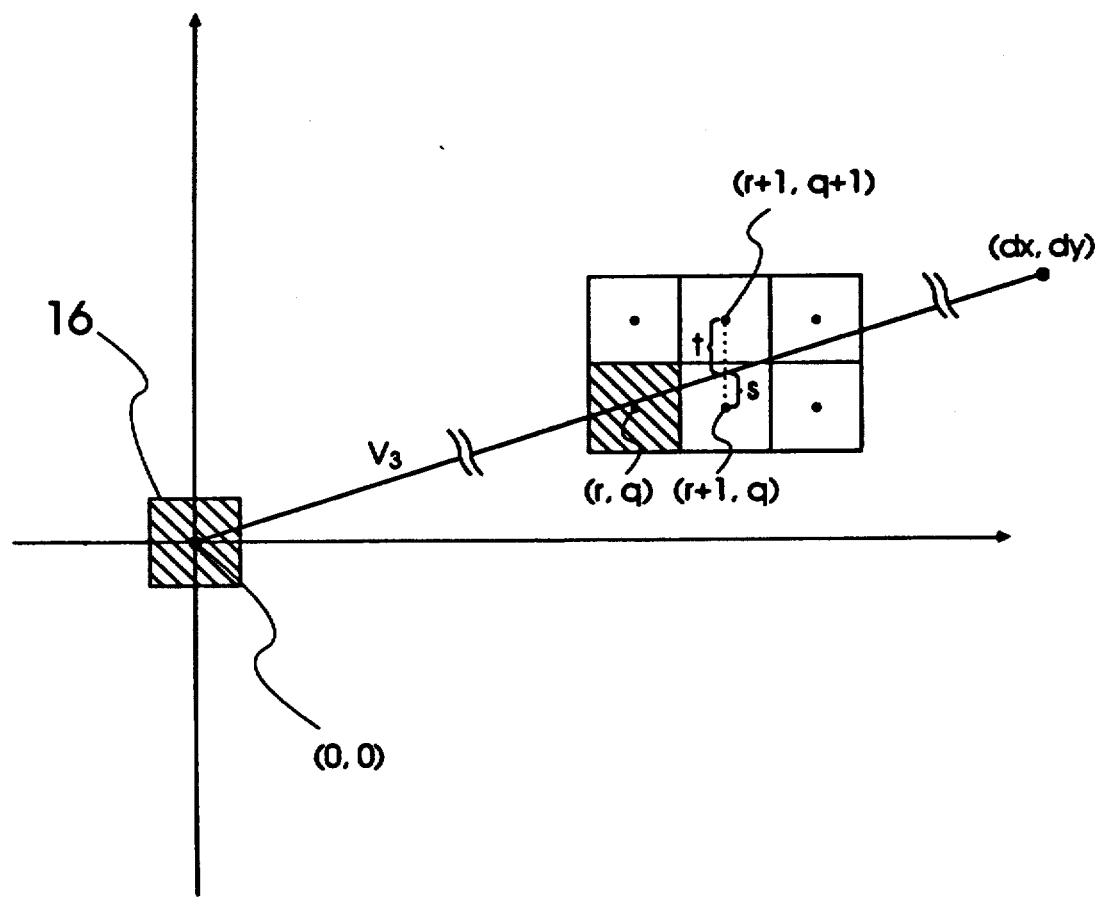
FIG. 8 illustrates aspects of the prior-art Bresenham pixel selection method.

FIG. 7 illustrates these eight cases graphically. Dashed lines X1 through X4 represent arbitrary X-major vectors, and Y1 through Y4 represent arbitrary Y-major vectors, in the first through fourth quadrants, respectively.

Appendix 5 sets forth the different values of h (either $+0.5$ or $-0.5$) for each of the left and right edges of the vectors X1 through X4 and Y1 through Y4, and the different signs of the decision variable d (either positive or negative) on each of the left and right edges of these vectors. For example, for the vector Y1, which is a Y-major vector in the first quadrant, the value of h for the left edge is $-0.5$. The sign of the variable d for points to the left of the edge is positive.

From these values, a computationally-convenient form of decision variable and stepping increment is derived for each of the X-major and Y-major vectors in each of the four quadrants.

Appendix 6 sets forth a table of these 8 computationally convenient decision variables and their corresponding stepping increments. The general operation performed for any given vector is:

(a) draw the initial endpoint of the vector and compute the decision variable d at this point;

(b) increment the major axis component by 1 and adjust d in accordance with the amount specified in Appendix 6;

(c) if the decision inequality specified in Appendix 6 is satisfied, draw this point and go to step (b);

(d) else increment the minor axis component by 1, adjust the decision variable d by the amount shown in Appendix 6, draw this point, and go to step (b).

For example, assume a hypothetical Y-major vector in the first quadrant. Such a vector corresponds to the first row of the table in Appendix 6.

In step (a), the initial endpoint of the vector is drawn. The initial value of the decision variable d is computed by computing the value of the right-hand term of the "Decision inequality" shown in the table, in this case by computing the value of $2|y(dx)| - 2|x(dy)| - |dy|$. Since at the initial endpoint $x=y=0$, this value is simply $-dy$.

In step (b), the major-axis coordinate is incremented by 1, that is, the computation $y := y+1$ is performed. The value of the decision variable d is adjusted by adding, in this case, 2dx.

In step (c), if the decision inequality is satisfied (i.e., if the adjusted value of d is nonpositive), then the pixel (x,y) is drawn. Else, in step (d), the minor-axis component is incremented, that is, the computation $x := x+1$ is computed, and the decision variable d is adjusted by adding, in this case, $-2|dy|$. The cycle then repeats as necessary to draw additional points.

Note that in the table in Appendix 6, the initial execution of step (b) above is combined with step (a). In the typical implementation of the Bresenham algorithm, sucsequent executions of step (b) are combined with steps (c) and (d), as seen, e.g., in Appendix 1.

In Appendix 6, x, y, dx, and dy are unsigned values. That is, a positive dy is used, whether or not the vector is drawn from top to bottom or bottom to top. Likewise, the amount by which d is incremented as y is stepped does not depend on the direction in which y is stepped.

It will be apparent to those of ordinary skill (having the benefit of this disclosure) that the $d>0$ and $d \leq 0$ tests (shown as the "Decision inequality" column of Appendix 6) can be converted into tests on the sign bit of d by subtracting 1 from d in the initialization. This is because if $d \leq 0$, then $d - 1 \leq -1$, in which case $d - 1 < 0$. So if $(d-1)$ has a negative sign bit, then necessarily $d \leq 0$.

Appendix 7 sets forth an equivalent form of Appendix 6 that has been so converted. This form of the general method advantageously allows all 8 cases of X-major and Y-major vectors to use the same computational approach, including the same testing of the decision variable d to determine whether to increment the minor axis component. In addition, the general method can advantageously be implemented using conventional Bresenham-type hardware.

3.7 Single-Operation Computation

The initial value of the decision variable d may be advantageously computed in a single operation by taking into account the drawing direction and whether the vector is X-major or Y-major.

Define new variables ndx ("negative dx") and ndy ("negative dy") as follows:

$$ndx = -dy = x[a] - x[b] \qquad (56)$$

$$ndy = -dy = y[a] - y[b] \qquad (57)$$

The signs of ndx and ndy can be utilized to find the drawing direction. If ndx is positive, then the drawing is "right-to-left" (i.e., decreasing x) in the x direction. Similarly, if ndy is positive, then the drawing direction is "top-to-bottom" (i.e., decreasing y) in the y direction.

Likewise, the major axis can be determined by comparing ndx and ndy in a similar manner to the comparison of dx and dy.

Based on the drawing direction and the major axis, a single addition operation can be performed to compute the initial value of the decision variable d. The addition operation uses as its operands (a) the major-axis delta (where the delta is ndx for X-major vectors, ndy for Y-major vectors), and (b) twice the minor-axis delta. The two addends are selectively bit-wise complemented (as shown by the tilde symbol), and the carry-in is selected, according to the drawing direction and the major axis.

Appendix 8 sets forth an equivalent form of the table of Appendix 6 that shows the desired selection of addends, complementation, and carry-in for this single-step operation.

3.8 Hardware Implementation

FIG. 15 depicts a high-level diagram of hardware for implementing the SPW drawing method. The discussion that follows relates to the operation of the hardware, for the purpose of illustrating to those of ordinary skill how actual drawing circuitry could be implemented.

The error term d is computed in an adder 60 having inputs A and B. The B input to the adder 60 includes the output of a multiplexer 92 that is in turn controlled by a ShiftSel control line.

The ShiftSel control line selects between an unshifted input value and a value that is shifted left one bit (i.e., which is multiplied by two), represented by a times-2 shifter 97. (As seen in the figure, in one variation the value shifted into the low-order bit may also be specified, resulting in a computation either of 2d or 2d+1).

Both the A and B inputs to the adder 60 may be selectively negated using the NegA and NegB control lines; this conditional negation is represented in FIG. 15 by exclusive-or (XOR) gates 94 and 96. In actual implementation, the logic circuitry would include a single XOR gate per bit entering the adder 60, each with its second input connected to NegA or NegB. Various ways to implement this conditional negation operation in the adder logic will be apparent to those of ordinary skill (who have the benefit of this disclosure).

(The illustration shows adder apparatus that is designed to perform a minimized number of additions in implementing the drawing method described above. Many variations and simplifications are possible by designing the logic circuitry to perform individual steps of the method in a more conventional manner. In some implementations this may be desirable, e.g., to simplify the adder circuit or its control.)

Initialization of the apparatus may be performed as follows. The ndx and ndy registers 86 and 90 are loaded by computing the differences between the starting and ending x and y positions for the edge in question and storing those values in the respective registers. In particular, $ndx = x[a] - x[b]$, and $ndy = y[a] - y[b]$. For simplicity, the registers for x[a], x[b], y[a], and y[b] are not shown. Subtraction is performed by negating the number to be subtracted and adding it to the other number, with the carry-in set to 1.

The X-major or Y-major orientation of the vector in question is determined as follows. A value Delta is computed by (a) disabling shifting on the B input to the adder 60; (b) driving the respective contents of the ndx register 86 onto the A input and of the ndy register 90 onto the B input of the adder 60; and (c) conditionally negating the A and B inputs, as well as conditionally seting the carry-in to the adder 60, in accordance with the table set forth in Appendix 13. The sign of this result determines in a single addition whether the SPW vector is X-major or Y-major.

For example, referring to Appendix 13, if the signs of dy and dx are both positive, then a computation is made of the value $\sim ndx + ndy + 1$, and this value (which is equal to $|dx| - |dy|$, shown as the "Delta value" in the Appendix) is compared with 0 (shown as "Major comparison" in the Appendix). If the sign of this value is negative, then the vector is Y-major.

This advantageously permits the computation the inequality for determination of the vector orientation in a single cycle in a hardware adder.

As a general proposition, either $|dx| - |dy|$ or $|dx| - |dy| - 1$ could be chosen as the "Delta value" computed in each case. The particular computations shown in the Appendix, however, advantageously deal with the case in which $|dy| = |dx|$.

It will be recalled that in this particular case, the vector can be treated as either an X-major vector or a Y-major vector. The computations in the Appendix cause this case to be reported as an X-major vector in every case except when dy is negative and dx is positive.

In this exception case, it would require a second addition step to compute $|dy| - |dx|$ instead of $|dy| - |dx| - 1$. For the quadrants where dx and dy have the same sign, either inequality can be computed in a single addition step in the hardware described and shown herein.

At this point the d register is loaded with its initial value. This is computed by driving the contents of the ndx register 86 onto one of the inputs of the adder 60 and of the ndy register 90 onto the other input. The B input to the adder is shifted left one position, thus multiplying it by 2. The choice whether to drive ndx and ndy onto the A and B inputs respectively, or vice versa, is controlled by the signs of the ndx, ndy, and Delta registers 86, 90, and 88, in accordance with Appendix 8.

Initialization is now complete. Two ways of operating the hardware shown to perform the actual iterative drawing method will be described.

In the first, simpler way, only one extra adder 63 is used to increment both the x and y coordinates (depicted by X register 64 and Y register 80). Thus, only one addition need be performed when stepping only along the major axis (when d<0). However, two separate addition steps must be performed when d≦0, i.e., when both the major and minor-axis coordinates must be incremented.

Therefore, after the sign bit of d is latched (by a latch 62), the major-axis coordinate is incremented (or decremented) and the major-axis increment term from Appendix 8 is added to d. If d had been greater than or equal to 0, then the minor-axis coordinate is incremented (or decremented) and the minor-axis increment term from Appendix 8 is also added to d. The x- and y-axis increment values are produced from ndx and ndy by shifting them left and conditionally negating them and setting the carry-in, with the low bit set to 0 in either case.

In a common hardware implementation, this extra addition cycle has little effect on performance. The reason is that access to the frame buffer memory is significantly faster when stepping horizontally. Modern dynamic random-access read-write memories (DRAMs) and multi-port random-access read-write memories (sometimes known as "video RAMs" or VRAMs) typically support an access mode called "page mode," in which adjacent addresses can be accessed more quickly than addresses that are widely separated. Otherwise, a random access must be performed, which takes 2 to 3 times as long as a page-mode access.

For example, in a typical 256K×4 DRAM or VRAM, two addresses I and J can be accessed in page mode if (A div 512) is equal to (B div 512). This is generally true for accesses horizontally along a scanline, but generally not true when the y coordinate is incremented. As a result, extra time is available whenever the Y axis is incremented, so extra cycles are available whenever both the major- and minor-axis coordinates are incremented. So, on hardware that takes advantage of page mode cycles, an adder is saved with little or no reduction in drawing speed.

A second way to step along the vector makes use of a single addition to d, whether or not d<0. Using this approach, an extra addition is required to produce the sum of the major- and minor-axis error increment terms so that x and y can be incremented simultaneously (if both must be incremented).

In this second way, at each step, the sign bit of d is latched using the latch 62 as described above. The sign bit is used to decide whether to add (a) the major-axis error increment term, or (b) the sum of the major- and minor-axis increments to d. (This latter sum may be conveniently derived from the value of the Delta register 88, as discussed below).

In either the first way or the second way, the sign of the decision variable/error term d selects whether to increment the minor-axis coordinate. Either $+1$ or $-1$ is used as the increment value, depending on the sign of ndx or ndy (whichever is the minor axis).

The Delta value computed above can be advantageously used in computing the sum of the major- and minor-axis error increments. It will be recalled that for X-major vectors, the major-axis error increment term is $2|dy|$ and the minor-axis increment is $2|dy| - 2|dx|$. Likewise, for Y-major vectors, the respective major- and minor-axis error increments are $2|dx|$ and $2|dx| - 2|dy|$.

The minor-axis increment terms are very close to the Delta values discussed above. Consequently, the Delta values can be used to determine the minor-axis increment terms by controlling the low-order bit that is output from the times-2 shifter 97 as well as the carry-in to the adder 60, and selecting whether to add Delta or its complement, as shown in Appendix 14.

4. Reduced-bit Decision Variable

A drawing method in accordance with the present invention advantageously permits the use of fewer bits in calculating the decision variable d than the conventional Bresenham method. The drawing method is applicable not only to the drawing of polygon edges, wide lines, and SPW vectors as described above, but also to digital difference analyzer (DDA) drawing approaches.

In particular, use of the drawing method reduces the number of bits needed to specify d to the same number of bits used to specify the x and y coordinates. This is an especially advantageous result because it allows the same number representation to be used for each.

4.1 Number Representation

It will be recalled that in the conventional Bresenham's drawing method and in the drawing methods described above, an iterative approach is used wherein at each step, a decision variable d is calculated. At any ith step, one of two possible values is added to the existing d[i] to produce d[i+1], depending on the value of d[i] itself. Also depending on the value of d[i], one of two possible pixels is selected to be drawn (or not to be drawn).

In the conventional Bresenham method, the decision variable d for an X-major vector can range from $-2dx+1$ to $+2dy$. For 16-bit coordinates, dx and dy can be as large as $(2^{16})-1$. Thus, the range of the decision variable d is $-(2^{17})+3$ to $(2^{17})-2$, requiring 2 more bits to represent than the 16 bits used to specify the x and y vector coordinates.

4.2 Dividing Terms by 2

A first bit can be saved as follows. It will be noted that for the illustrative Bresenham drawing method shown in Appendix 1, both of the error increment constants e1 and e2 (each representing a possible value to be added to d[i], depending on the value of d[i]) are even numbers. The initial value d[1] of d may be an even number. However, by testing whether d[i]<0, instead of testing for d[i]≦0, it does not matter whether the low-order bit of d[1] is 1 or 0.

Consequently, both the initial value d[1] of d and the error increment constants e1 and e2 can be divided by 2, serving one bit.

4.3 Testing for Overflow: Special Case

A second bit can also be saved, as follows. Assume that (as fairly typically occurs in computer systems) an overflow status bit exists that is set when an addition overflows and cleared when an addition does not overflow.

If d is negative and has a positive number added to it, then the result becomes positive only if there is a carry into the sign bit, that is, an overflow occurs out of the unsigned version of the decision variable d.

This fact is used in the drawing method illustrated by Appendix 9. The method utilizes the overflow status bit in place of the negative test in the ordinary Bresenham drawing method.

This utilization is workable because, if there actually were sign bits on the d, e1, and e2 values shown in Appendix 9, the sign bit after each addition to d would be equal to the opposite of the overflow status bit. This is true because if d is negative (as it is initially because of the initialization step), it has a positive number (i.e., dy) added to it; the result becomes positive only if there is a carry into the sign bit, that is, an overflow out of the unsigned version of the decision variable d.

It will be seen from Appendix 9 that at each iteration, e1=dy is added to the decision variable d until an overflow occurs, indicating a positive result.

Thereafter, e2=dy−dx is added to the (now positive) decision variable d. Since the vector by hypothesis is X-major, dy−dx is guaranteed to be negative in every case with one exception, namely the case when dy=dx. Again, a positive and a negative number are being added, so the result is only positive if there is a carry into the sign bit position, that is, an overflow out of the unsigned version of the decision variable d.

It will be noted that the minor-axis coordinate (namely x in the illustration shown in Appendix 9) is incremented at each branch of the "if not Overflow" test. This has the result, advantageous in some configurations, of having no additions intervening between setting of the Overflow bit and testing that bit. Equivalently, the x incrementation can be moved outside the "if not Overflow" test.

The exception case must be dealt with, i.e., the case when dx=dy and thus dy−dx is not negative as assumed above. This case is handled by setting e2=−dy−dx−1, and using a carry-in of 1 in the addition of e2 to d. Then e2 is indeed always negative; adding it to a positive d, with a carry-in, will produce an overflow if the result is positive.

Appendix 10 shows the drawing method of Appendix 9, modified to take the foregoing exception case into account.

4.4 Testing for Overflow: General Case

This reduced-bit method can be modified to permit convenient computation of all 8 cases of quadrant and major axis (see FIG. 7).

To that end, Appendix 11 sets forth a table similar to Appendix 6. Likewise, Appendix 12 sets forth a version of the table which uses absolute values of dx and dy and which simplifies some of the pertinent computations. As in Appendix 7, the tilde symbol indicates bit-wise complementation; therefore, in two's complement notation, $-I = \sim I+1$, and so $-I-1 = \sim I$.

It will be noted by those of ordinary skill (who have the benefit of this disclosure) that in Appendix 12, the term $|dx|-|dy|-1 = |dx|+\sim|dy|$. This permits convenient implementation in hardware.

The resultant bit savings means that, given x and y in a particular number representation, the decision variable d can be expressed in the same number representation.

The same technique can be applied to wide lines. Polygons need use only the single-step computation discussed above, since the error increment constants are already divided by two.

An additional advantage of this approach is that it allows the same hardware to perform both integer Bresenham-type edge stepping (of the novel type disclosed herein) and fixed-point DDA edge stepping. In fixed-point DDA computations, the error term (conventionally referred to as ord) is an unsigned fraction. When it carries out, 1 must be added to the minor-axis coordinate.

4.5 Hardware Implementation

FIG. 16 shows a high-level diagram of hardware for implementing the reduced-bit SPW vector drawing method. The discussion that follows relates to the operation of the hardware, for the purpose of illustrating to those of ordinary skill how actual drawing circuitry could be implemented.

It will be apparent that FIG. 16 is adapted from FIG. 15, which also relates to drawing SPW vectors. The same adaptation of the circuitry of FIG. 15 can be utilized for circuitry for stepping along polygon and wide-line edges, as shown in FIG. 17.

Referring to FIG. 16, a first modification of the circuitry of FIG. 15 relates to the use of the latch 62. Instead of latching the complement of the sign bit of the output of the adder 60 (as in FIG. 15), the carry-out in the circuitry of FIG. 16 is latched by latch 62. The latched carry-out bit is used in the same manner as the complement of the sign bit.

A second modification of the circuitry of FIG. 15 relates to the times-2 shifter 97, which is replaced by a divide-by-2 shifter 98. The shifter 98 accepts as input a high order bit, and outputs a low order bit as well as the shifted value.

In the polygon and wide-line circuitry shown in FIG. 17, the shifter 98 is not needed. However, in the wide-line circuitry, dx' and dx'−dy' must be used in place of 2dx' and 2dx'−2dy', with the initial d correspondingly divided by 2.

Next, the signs of the results of computing ndx and ndy must be temporarily latched. The sign of the result is simply a three-way parity computation of the sign bits of the two input values and the carry-out of the adder 60. More specifically, if only one of the three values (sign bits and carry-out) are 0 (i.e., positive sign bits or no carry-out), or if all three of the values are 0, then the result of the parity computation is 0, i.e., the resulting sign is positive.

These sign bits are used to compute the sign of the Delta value, which is computed in the same way. This computation is not necessary in the polygon- and wide-line circuitry, since dx' and dx'−dy' are provided and the sign of both is known (the first is positive and the second is negative).

Finally, the computation of d is performed differently in the circuitry of FIG. 16 as compared with that of FIG. 15. For vectors, the table in Appendix 11 shows the value to compute for the initial d.

The sign bit of the value to be divided by 2, taken from the table, is input as the high bit into the divide-by-2 shifter 98. If the number to be divided by 2 is also to be incremented, then the low bit output from the divide-by-2 shifter is fed into the adder 60 as its carry-in.

These divide-by-2 operations are not needed in circuitry for implementing the polygon-edge and wide-line drawing methods, since dx/2 (or dy/2) are not needed to initialize d.

Once initialization has been performed, the edge-stepping operation proceed in essentially the same way as for the versions of the drawing methods that require a large range of values for d. The only differences are that ndx and ndy are used in place of 2ndx and 2ndy, and the value that is latched to control the edge stepping operation is the carry-out instead of the complement of the sign bit.

DDA drawing can be performed utilizing the same hardware, with only minor changes in the control arrangement needed. In the fixed-point DDA drawing method, the error term, d, represents the error in terms of a fraction of a pixel, i.e., a value from 0 to 1. Only one error increment value is needed, and it also represents a fractional pixel value from 0 to 1. When the sum of the two exceeds 1, then 1 is subtracted from the error and added to the integral pixel position.

In other words, the carry-out from the fractional portion of the pixel position must be added to the integral portion, just as if they were being combined in a single adder instead of in two separate, smaller adders.

For a positive error increment constant, this is exactly the operation performed in the reduced-error-term hardware. For a negative error increment constant, the complement of the carry-out must be used instead. This is because in this case, a carry-out will occur on every addition except the one that causes the error term to underflow. Thus, if a carry-out occurs, the minor-axis coordinate should be left unchanged; if a carry-out does not occur, 1 should be subtracted from the minor-axis coordinate. (This adjustment applies only to vectors, not polygons, since for polygons the error increment constant is always positive.)

If both possible adjustments to the error term d are to be computed essentially at once as discussed above in connection with SPW drawing hardware, then the Delta value computed in determining the SPW vector orientation can be used in conjunction with the reduced-bit approach just described.

In these circumstances, however, the error increment terms are not $2|dx|$, $2|dx|-2|dy|$, etc., but instead are ½ of those values, respectively, minus 1 so that the result will be negative even if $|dx|=|dy|$.

The 1 need not be subtracted in each of the 8 possible vector orientation cases, however. It is necessary to subtract 1 only in those cases where $|dx|=|dy|$ satisfies the major-axis comparison.

In the table shown in Appendix 15, an asterisk in the leftmost column marks those cases, for each of the four quadrants, in which a vector with $|dx|=|dy|$ is drawn. It will be noted that these are also the four cases in which calculation of the error increment involves adding 1 to the computed Delta value or its complement. This addition of 1 wold be performed by driving a high value into the carry-in of the adder 60.

In other words, the requirement (discussed above) that the minor-axis error increment term be a negative number in all cases is fulfilled. (This would be true even if vectors in which $|dx|=|dy|$ had been called a Y-major vector for the quadrants in which dx and dy have the same sign.)

It is to be understood that the form of the invention described is to be taken as the presently preferred embodiment. Various modifications and changes may be made without departing from the spirit and the scope of the invention as set forth below in the claims.

For example, the various computations described above and/or shown in the Appendixes can be rearranged and/or replaced by mathematically equivalent computations in order to achieve optimal computational efficiency on particular hardware or in conjunction with particular software.

As an illustration, in Appendix 10 the computation d :=d+e2 can be replaced by its equivalent form d :=d+dy followed by d :=d−dx, followed by d :=d−1.

It is intended that the following claims be interpreted to embrace all such modifications and changes.

APPENDIX 1

BASIC BRESENHAM VECTOR-DRAWING METHOD

Assumptions for this illustration: X-major vector, with x[b] > x[a] and y[b] > y[a].

```
const dx := x[b] - x[a]
const dy := y[b] - y[a]

x := x[a]              ; Initialize x and y at origin
y := y[a]

e1 := 2dy              ; Define error increment constants
e2 := 2dy - 2dx        ;     e1 and e2 for alternative use
```

APPENDIX 1
BASIC BRESENHAM VECTOR-DRAWING METHOD

```
d := 2dy - dx              ; Initialize decision vbl d
                           ;     per Equation (15)

WritePixel(x,y)            ; Draw the pixel containing
                           ;     the initial point while x < x[b] do          ; Begin WHILE loop:

x := x + 1             ; Increment x (X-major vector)

if d ≤ 0 then          ; For a nonpositive d:
                           ;     New ref point is (x+1, y)
        d := d + e1        ;     Calculate new d
                           ;         per Equation (14)

else                   ; For a positive d:

y := y + 1         ;     New ref point is (x+1, y)

d := d + e2        ;     Calculate new d
                           ;         per Equation (12)
    end if WritePixel(x,y)        ; Draw the pixel containing
                           ;     the new ref point end do                     ; Continue with the WHILE loop
```

APPENDIX 2

BASIC POLYGON EDGE DETERMINATION

Assumptions for this illustration: Y-major vector, with x[b] > x[a] and y[b] > y[a]

```
const dx := x[b] - x[a]
const dy := y[b] - y[a]

x := x[a]                  ; Initialize x and y at origin
y := y[a]

d := dx                    ; Initialize decision vbl d
                           ;     per Equation (28)

SelectPixel(x,y)           ; Select the pixel containing
                           ;     the initial point while y < y[b] do          ; Begin WHILE loop:

y := y + 1             ; Increment y (Y-major vector)

if d ≤ 0 then          ; For a nonpositive d:
                           ;     New ref point is (x, y+1)
```

-continued
APPENDIX 2
BASIC POLYGON EDGE DETERMINATION

```
            d := d + dx        ;   Calculate new d per Eq. (21)

else                       ; For a positive d:
        x := x + 1             ;   New ref point is (x+1,y+1)

d := d+dx-dy           ;   Calculate new d per Eq. (22)

end if

SelectPixel(x,y)           ; Select the pixel containing
                               ;    the new ref point end do                         ; Continue with the WHILE loop
```

APPENDIX 3

GENERAL POLYGON EDGE DETERMINATION

```
const dx := x[b] - x[a]
const dy := y[b] - y[a]

x := x[a]                     ; Initialize x and y at origin
 y := y[a]
if dy < 0 then dy' = |dy|      ; Initialize dy', dx', m, and d
          else dy' = dy        ;    per Equations (25) - (28)

dx':= dx zmod dy'
 m := dx zdiv dy'
 d := dx'
SelectPixel(x,y)               ; Select pixel containing init. pt.

while y < y[b] do              ; Begin WHILE loop:

y := y + 1                 ; Increment y (Y-major vector)

x := x + m                 ; Add another m to the x adjustment if d ≤ 0 then              ; For a nonpositive d:
                               ;    Pixel to select is (x+m,y+1), d := d + dx'           ;   Calculate new d per Eq. (21)

else                       ; For a negative d:

x := x + 1             ;   Pixel to select is (x+m+1,y+1)

d := d+dx'-dy'         ;   Calculate new d per Eq. (22)

end if
    SelectPixel(x,y)           ; Select the pixel containing
                               ;    the new    p int end do                         ; Continue with the WHILE loop
```

APPENDIX 4

WIDE-LINE EDGE DETERMINATION

```
const dx := x[b] - x[a]
const dy := y[b] - y[a]

x := x[a]                  ; Initialize x and y at origin
y := y[a]

if dy < 0 then dy' = |dy|  ; Initialize dy', dx', m,
        else dy' =  dy     ;     per Equations (25) - (27)

dx':= dx zmod dy'
 m := dx zdiv dy' if left_edge               ; Initialize d per Eq. 42, 45 then d := floor(sqrt((w^2) * (dy'^2 + dx'^2)))

else d := -ceiling(sqrt((w^2) * (dy'^2 + dx'^2)))

d := d + 2y(dx) + 2x(dy)

SelectPixel(x,y)           ; Select pixel containing init. pt.

while y < y[b] do          ; Begin WHILE loop:

y := y + 1             ; Increment y (Y-major vector)

x := x + m             ; Add another m to the x adjustment if d ≤ 0 then d := d + 2dx' ; Do nothing to x coordinate
                           ;     and adjust d else x := x + 1    ; Or, increment x by 1 d := d+2dx'-2dy'    ; w/ different adj. of d end else end if

SelectPixel(x,y)       ; Select the pixel containing
                           ;     the new ref point end do                     ; Continue with the WHILE loop
```

APPENDIX 5
VALUES OF h AND d FOR X- AND Y-MAJOR VECTORS

| Vector | Edge | h | d |
|---|---|---|---|
| Y1 | L | −0.5 | + |
|    | R | +0.5 | − |
| Y2 | L | +0.5 | + |
|    | R | −0.5 | − |
| Y3 | L | −0.5 | − |
|    | R | +0.5 | + |
| Y4 | L | +0.5 | − |
|    | R | −0.5 | + |
| X1 | L | +0.5 | + |
|    | R | −0.5 | − |
| X2 | L | −0.5 | + |
|    | R | +0.5 | − |
| X3 | L | +0.5 | − |
|    | R | −0.5 | + |
| X4 | L | −0.5 | − |
|    | R | +0.5 | + |

Note: h is measured horizontally for Y-major vectors, vertically for X-major vectors

APPENDIX 6
UNSIGNED DECISION VARIABLES FOR SINGLE-PIXEL-WIDE COMPUTATION

| Maj | Sign dy | Sign dx | Edge | Decision inequality | Amount to incr. d when x, y are incremented: y incr. | x incr. |
|---|---|---|---|---|---|---|
| Y | + | + | L | $0 \geq 2\|y(dx)\| - 2\|x(dy)\| - \|dy\|$ | $2\|dx\|$ | $-2\|dy\|$ |
| Y | + | − | R | $0 \geq 2\|y(dx)\| - 2\|x(dy)\| - \|dy\|$ | $2\|dx\|$ | $-2\|dy\|$ |
| Y | − | + | L | $0 \geq 2\|y(dx)\| - 2\|x(dy)\| - \|dy\|$ | $2\|dx\|$ | $-2\|dy\|$ |
| Y | − | − | R | $0 > 2\|y(dx)\| - 2\|x(dy)\| - \|dy\|$ | $2\|dx\|$ | $-2\|dy\|$ |
| X | + | + | R | $0 < 2\|y(dx)\| - 2\|x(dy)\| + \|dx\|$ | $2\|dx\|$ | $-2\|dy\|$ |
| X | + | − | L | $0 \leq 2\|y(dx)\| - 2\|x(dy)\| + \|dx\|$ | $2\|dx\|$ | $-2\|dy\|$ |
| X | − | + | R | $0 < 2\|y(dx)\| - 2\|x(dy)\| + \|dx\|$ | $2\|dx\|$ | $-2\|dy\|$ |
| X | − | − | L | $0 \leq 2\|y(dx)\| - 2\|x(dy)\| + \|dx\|$ | $2\|dx\|$ | $-2\|dy\|$ |

APPENDIX 7
SIGN-BIT DECISION VARIABLES FOR SINGLE-PIXEL-WIDE COMPUTATION

| Maj | Sign dy | Sign dx | Edge | Decision inequality | Amount to incr. d when x, y are incremented: y incr. | x incr. | Initial d value |
|---|---|---|---|---|---|---|---|
| Y | + | + | L | $0 > 2\|y\|dx - 2\|x\|dy - dy - 1$ | $2\|dx\|$ | $-2\|dy\|$ | $2dx - dy - 1$ |
| Y | + | − | R | $0 > -2\|y\|dx - 2\|x\|dy - dy$ | $2\|dx\|$ | $-2\|dy\|$ | $-2dx - dy$ |
| Y | − | + | L | $0 > 2\|y\|dx - 2\|x\|dy + dy - 1$ | $2\|dx\|$ | $-2\|dy\|$ | $2dx + dy - 1$ |
| Y | − | − | R | $0 > -2\|y\|dx - 2\|x\|dy + dy$ | $2\|dx\|$ | $-2\|dy\|$ | $-2dx + dy$ |
| X | + | + | R | $0 > 2\|y\|dx + 2\|x\|dy - dx$ | $2\|dx\|$ | $-2\|dy\|$ | $2dy - dx$ |
| X | + | − | L | $0 > 2\|y\|dx + 2\|x\|dy + dx - 1$ | $2\|dx\|$ | $-2\|dy\|$ | $2dy + dx - 1$ |
| X | − | + | R | $0 > 2\|y\|dx - 2\|x\|dy - dx$ | $2\|dx\|$ | $-2\|dy\|$ | $-2dy - dx$ |
| X | − | − | L | $0 > 2\|y\|dx - 2\|x\|dy + dx - 1$ | $2\|dx\|$ | $-2\|dy\|$ | $-2dy + dx - 1$ |

APPENDIX 8
SINGLE-OPERATION d[1] COMPUTATION

| Maj | Sign dy | Sign dx | Amount to incr. d when x, y are incremented: y incr | x incr. | Initial d value d[1] | Computation to Be Performed of Initial d Value |
|---|---|---|---|---|---|---|
| Y | + | + | −2ndx | 2ndy | $-2ndx + ndy - 1$ | $\sim 2ndx + ndy + 0$ |
| Y | + | − | 2ndx | 2ndy | $2ndx + ndy$ | $2ndx + ndy + 0$ |
| Y | − | + | −2ndx | −2ndy | $-2ndx - ndy - 1$ | $\sim 2ndx + \sim ndy + 1$ |
| Y | − | − | 2ndx | −2ndy | $2ndx - ndy$ | $2ndx + \sim ndy + 1$ |
| X | + | + | 2ndx | −2ndy | $-2ndy + ndx$ | $\sim 2ndy + ndx + 1$ |
| X | + | − | −2ndx | −2ndy | $-2ndy - ndx - 1$ | $\sim 2ndy + \sim ndx + 1$ |
| X | − | + | 2ndx | 2ndy | $2ndy + ndx$ | $2ndy + ndx + 0$ |
| X | − | − | −2ndx | 2ndy | $2ndy - ndx - 1$ | $2ndy + \sim ndx + 0$ |

APPENDIX 9

REDUCED-BIT SPW DRAWING METHOD

Assumptions: all values are unsigned; X-major vector in first quadrant

```
x := x[a]                        ; Initialize x and y at origin
y := y[a]

dx := |x[b] - x[a]|
dy := |y[b] - y[a]| e1 := dy                         ; Define error increment constant
e2 := dy - dx                    ;     for alternative use d := -(dx zdiv 2)               ; Initialize decision variable d
                                 ;     as a negative number d := d + e1, set Overflow status bit Loop until done:

DrawPoint(x,y)

if not Overflow x := x + 1
        d := d + e1, set Overflow status bit else
            x := x + 1
            y := y + 1
            d := d + e2, set Overflow status bit
        end else end if end loop
```

APPENDIX 10

REDUCED-BIT SPW DRAWING METHOD

Assumptions: all values are unsigned; X-major vector in first quadrant

```
x := x[a]                        ; Initialize x and y at origin
y := y[a]

dx := |x[b] - x[a]|
dy := |y[b] - y[a]|
```

APPENDIX 10
REDUCED-BIT SPW DRAWING METHOD

```
e1 := dy                              ; Define error increment constant
e2 := dy - dx - 1                     ;     for alternative use d  := -(dx zdiv 2)                    ; Initialize decision variable d
                                      ;     as a negative number d  := d + e1, set Overflow status bit Loop until done:

DrawPoint(x,y)

if not Overflow x := x + 1
        d := d + e1, set Overflow status bit else
            x := x + 1
            y := y + 1
            d := d + e2, set Overflow status bit
        end else end if end loop
```

APPENDIX 11
REDUCED-BIT COMPUTATION FOR 8 CASES

Assumptions:
dy = y[b] − y[a] (not absolute values)
dx = x[b] − x[a] (not absolute values)

| Maj | Sign dy | dx | Edge | Initial d value d[1] | e1 | e2 |
|---|---|---|---|---|---|---|
| Y | + | + | L | (−dy − 1) zdiv 2 | +dx | +dx − dy − 1 |
| Y | + | − | R | (−dy − 0) zdiv 2 | −dx | −dx − dy − 1 |
| Y | − | + | L | (+dy − 1) zdiv 2 | +dx | +dx + dy − 1 |
| Y | − | − | R | (+dy − 0) zdiv 2 | −dx | −dx + dy − 1 |
| X | + | + | R | (−dx − 0) zdiv 2 | +dy | +dy − dx − 1 |
| X | − | − | L | (+dx − 1) zdiv 2 | +dy | +dy + dx − 1 |
| X | − | + | R | (−dx − 0) zdiv 2 | −dy | −dy − dx − 1 |
| X | − | − | L | (+dx − 1) zdiv 2 | −dy | −dy + dx − 1 |

APPENDIX 12
REDUCED-BIT COMPUTATION FOR 8 CASES

Assumptions:
dy = y[b] − y[a] (not absolute values)
dx = x[b] − x[a] (not absolute values)

| Maj | Sign dy | dx | Edge | Initial d value d[1] | e1 | e2 |
|---|---|---|---|---|---|---|
| Y | + | + | L | −\|dy\| zdiv 2 | \|dx\| | \|dx\| − \|dy\| − 1 |
| Y | + | − | R | −\|dy\| zdiv 2 | \|dx\| | \|dx\| − \|dy\| − 1 |
| Y | − | + | L | −\|dy\| zdiv 2 | \|dx\| | \|dx\| − \|dy\| − 1 |
| Y | − | − | R | −\|dy\| zdiv 2 | \|dx\| | \|dx\| − \|dy\| − 1 |
| X | + | + | R | −\|dy\| zdiv 2 | \|dy\| | \|dy\| − \|dx\| − 1 |
| X | + | − | L | −\|dy\| zdiv 2 | \|dy\| | \|dy\| − \|dx\| − 1 |
| X | − | + | R | −\|dy\| zdiv 2 | \|dy\| | \|dy\| − \|dx\| − 1 |

-continued
APPENDIX 12
REDUCED-BIT COMPUTATION FOR 8 CASES
Assumptions:
dy = y[b] − y[a] (not absolute values)
dx = x[b] − x[a] (not absolute values)

| Maj | Sign dy | dx | Edge | Initial d value d[1] | e1 | e2 |
|---|---|---|---|---|---|---|
| X | − | − | L | ~|dy| zdiv 2 | |dy| | |dy| − |dx| − 1 |

APPENDIX 13
DETERMINATION OF VECTOR ORIENTATION
Assumptions:
dy = y[b] − y[a] (not absolute values)
dx = x[b] − x[a] (not absolute values)

| Sign dy | dx | Decision inequality | Major comparison | Delta value computed |
|---|---|---|---|---|
| + | + | dx > dx | 0 > ~ndx + ndy + 1 | |dx| − |dy| |
| + | − | dy > −dx | 0 > ndx + ndy | |dx| − |dy| |
| − | + | −dy ≧ dx | 0 > ~ndx + ~ndy + 1 | |dx| − |dy| − 1 |
| − | − | −dy > −dx | 0 > ndx + ~ndy + 1 | |dx| − |dy| |

APPENDIX 14
SIMULTANEOUS COMPUTATION OF SUM OF MAJOR- AND MINOR-AXIS INCREMENT TERMS
Assumptions:
dy = y[b] − y[a] (not absolute values)
dx = x[b] − x[a] (not absolute values)

| Maj | Sign dy | dx | Major comparison | Delta value computed | ½ times minor-axis error incr. |
|---|---|---|---|---|---|
| Y | + | + | 0 > ~ndx + ndy + 1 | |dx| − |dy| | Delta + 0 |
| Y | + | − | 0 > ndx + ndy + 0 | |dx| − |dy| | Delta + 0 |
| Y | − | + | 0 > ~ndx + ~ndy + 1 | |dx| − |dy| − 1 | Delta + 1 |
| Y | − | − | 0 > ndx + ~ndy + 1 | |dx| − |dy| | Delta + 0 |
| X | + | + | 0 ≦ ~ndx + ndy + 1 | |dx| − |dy| | ~Delta + 1 |
| X | + | − | 0 ≦ ndx + ndy + 0 | |dx| − |dy| | ~Delta + 1 |
| X | − | + | 0 ≦ ~ndx + ~ndy + 1 | |dx| − |dy| − 1 | ~Delta + 0 |
| X | − | − | 0 ≦ ndx + ~ndy + 1 | |dx| − |dy| | ~Delta + 1 |

APPENDIX 15
REDUCED-BIT SIMULTANEOUS COMPUTATION OF SUM OF MAJOR- AND MINOR-AXIS INCREMENT TERMS
Assumptions:
dy = y[b] − y[a] (not absolute values)
dx = x[b] − x[a] (not absolute values)

| Maj | Sign dy | dx | Major comparison | Delta value computed | Minor-axis error incr. |
|---|---|---|---|---|---|
| Y | + | + | 0 > ~ndx + ndy + 1 | |dx| − |dy| | Delta + 0 |
| Y | + | − | 0 > ndx + ndy + 0 | |dx| − |dy| | Delta + 0 |
| *Y | − | + | 0 > ~ndx + ~ndy + 1 | |dx| − |dy| − 1 | Delta + 1 |
| Y | − | − | 0 > ndx + ~ndy + 1 | |dx| − |dy| | Delta + 0 |
| *X | + | + | 0 ≦ ~ndx + ndy + 1 | |dx| − |dy| | ~Delta + 1 |
| *X | + | − | 0 ≦ ndx + ndy + 0 | |dx| − |dy| | ~Delta + 1 |
| X | − | + | 0 ≦ ~ndx + ~ndy + 1 | |dx| − |dy| − 1 | ~Delta + 0 |
| *X | − | − | 0 ≦ ndx + ~ndy + 1 | |dx| − |dy| | ~Delta + 1 |

What is claimed is:

1. A method for illuminating a portion of a pixel grid to represent a portion of a polygon edge, each pixel of said grid being definable by a unique point on a cartesian coordinate system in which distances may be measured in "units,"

each such point having a horizontal component in the x direction and a vertical component in the y direction, said polygon edge having an initial point represented by a coordinate (x[a], y[a]) and having an endpoint represented by a coordinate (x[b], y[b]), the horizontal and vertical distances between the initial point and endpoint being represented respectively by dx = x[b] − x[a] and dy = y[b] − y[a], said method comprising the steps of:

(a) initializing the following variables to the following values:

dy' = |dy| if dy < 0, else dy' = dy dx' = dx zmod dy', where zmod is a modulus operator which renders dx' equal to a remainder of dx divided by dy';

m = dx zdiv |dy'|, where |dy'| is the absolute value of dy' and where zdiv is an operator which renders m equal to an integer result of dividing dx by |dy'|;

d = dx';

(b) illuminating an initial pixel (x,y) containing the initial point (x[a],y[a]);

(c) resetting the following variables to the following values:

y = y + 1 if dy ≧ 0, else y = y − 1  x = x + m;

(d) if d is nonpositive, then (1) illuminating the pixel (x,y), and (2) resetting the variable d = d + dx', else (i) illuminating the pixel (x + 1, y), and (ii) resetting the variable d = d + dx' − dy'.

2. The method of claim 1, further comprising the repetition of steps (c) and (d) of claim 2 until y is not less than y[b].

3. A method for illuminating a portion of a pixel grid to represent a portion of a polygon edge,
   each pixel of said grid being definable by a unique point on a cartesian coordinate system in which distances may be measured in "units,"
   each such point having a horizontal component in the x direction and a vertical component in the y direction,
   said polygon edge having an initial point represented by a coordinate (x[a],y[a]) and having an endpoint represented by a coordinate (x[b],y[b]),
   the horizontal and vertical distances between the initial point and endpoint being represented respectively by $dx = x[b] - x[a]$ and $dy = y[b] - y[a]$,
   a "previous pixel," containing a point on the polygon edge, being already illuminated,
   said method comprising the steps of:
   (a) initializing the following variables to the following values:
      $dy' = |dy|$ if $dy < 0$, else $dy' = dy$
      $dx' = dx$ zmod $dy'$, where zmod is a modulus operator which renders $dx'$ equal to a remainder of dx divided by $dy'$;
      $m = dx$ zdiv $|dy'|$, where $|dy'|$ is the absolute value of $dy'$ and where zdiv is an operator which renders m equal to an integer result of dividing dx by $|dy'|$;
      $d = dx'$;
   (b) if d is nonpositive, then
      (1) illuminating the pixel containing the point m units to the right of and 1 unit up from the previous pixel, and
      (2) resetting the variable $d = d + dx'$;
   (c) else if d is positive, then
      (1) illuminating the pixel containing the point $m + 1$ units to the right of and 1 unit up from the previous pixel, and
      (2) resetting the variable $d = d + dx' - dy'$.

4. A method for illuminating a portion of a pixel grid lying on or immediately to the right of a left edge of a "wide line" segment,
   each pixel of said grid being definable by a unique point on a cartesian coordinate system in which distances may be measured in "units,"
   each such point having a horizontal component in the x direction and a vertical component in the y direction,
   said wide line segment having a width w and whose left edge is defined by an initial point represented by a coordinate (x[a],y[a]) and an endpoint represented by a coordinate (x[b],y[b]),
   the horizontal and vertical distances between the initial point and endpoint being represented respectively by $dx = x[b] - x[a]$ and $dy = y[b] - y[a]$,
   said method comprising the steps of:
   (a) initializing the following variables to the following values:
      $dy' = |dy|$ if $dy < 0$, else $dy' = dy$
      $dx' = dx$ zmod $dy'$, where zmod is a modulus operator which renders $dx'$ equal to a remainder of dx divided by $dy'$;
      $m = dx$ zdiv $|dy'|$, where $|dy'|$ is the absolute value of $dy'$ and where zdiv is an operator which renders m equal to an integer result of dividing dx by $|dy'|$;
      $d = \text{floor}(\text{sqrt}((w^2) * dy'^2 + dx'^2))$
   (b) illuminating an initial pixel (x,y) containing the initial point (x[a],y[a]);
   (c) resetting the following variables to the following values:
      $y = y + 1$ if $dy \geq 0$, else $y = y - 1$  $x = x + m$;
   (d) if d is nonpositive, then
      (1) illuminating the pixel (x,y), and
      (2) resetting the variable $d = d + 2dx'$,
      else
      (i) illuminating the pixel (x + 1, y), and
      (ii) resetting the variable $d = d + 2dx' - 2dy'$.

5. The method of claim 4, further comprising the repetition of steps (c) and (d) of claim 5 until y is not less than y[b].

6. A method for illuminating a portion of a pixel grid lying on or immediately to the right of a left edge of a "wide line" segment,
   each pixel of said grid being definable by a unique point on a cartesian coordinate system in which distances may be measured in "units,"
   each such point having a horizontal component in the x direction and a vertical component in the y direction,
   said wide line segment having a width w and whose left edge is defined by an initial point represented by a coordinate (x[a],y[a]) and an endpoint represented by a coordinate (x[b],y[b]),
   the horizontal and vertical distances between the initial point and endpoint being represented respectively by $dx = x[b] - x[a]$ and $dy = y[b] - y[a]$,
   a "previous pixel," containing a point on or immediately to the right of the wide line edge, being already illuminated,
   said method comprising the steps of:
   (a) initializing the following variables to the following values:
      $dy' = |dy|$ if $dy < 0$, else $dy' = dy$
      $dx' = dx$ zmod $dy'$, where zmod is a modulus operator which renders $dx'$ equal to a remainder of dx divided by $dy'$;
      $m = dx$ zdiv $|dy'|$, where $|dy'|$ is the absolute value of $dy'$ and where zdiv is an operator which renders m equal to an integer result of dividing dx by $|dy'|$;
      $d = \text{floor}(\text{sqrt}((w^2) * dy'^2 + dx'^2))$
   (b) if d is nonpositive, then
      (1) illuminating the pixel containing the point m units to the right of and 1 unit up from the previous pixel, and
      (2) resetting the variable $d = d + 2dx'$;
   (c) else if d is positive, then
      (1) illuminating the pixel containing the point $m + 1$ units to the right of and 1 unit up from the previous pixel, and
      (2) resetting the variable $d = d + 2dx' - 2dy'$.

7. A method for ensuring the nonillumination ("darkening") of portions of a pixel grid lying on or immediately to the right of a right edge of a "wide line" segment,
   each pixel of said grid being definable by a unique point on a cartesian coordinate system in which distances may be measured in "units,"
   each such point having a horizontal component in the x direction and a vertical component in the y direction,
   said wide line segment having a width w and whose right edge is defined by an initial point represented by a coordinate (x[a],y[a]) and an endpoint represented by a coordinate (x[b],y[b]),
the horizontal and vertical distances between the initial point and endpoint being represented respectively by dx=x[b]−x[a] and dy=y[b]−y[a],
said method comprising the steps of:
(a) initializing the following variables to the following values:
dy′=|dy| if dy <0, else dy′=dy
dx′=dx zmod dy′, where zmod is a modulus operator which renders dx′ equal to a remainder of dx divided by dy′;
m=dx zdiv |dy′|, where |dy′| is the absolute value of dy′ and where zdiv is an operator which renders m equal to an integer result of dividing dx by |dy′|;
d= −ceiling(sqrt((w 2)*dy′ 2+dx′ 2)))
(b) darkening an initial pixel (x,y) containing the initial point (x[a],y[a]);
(c) resetting the following variables to the following values:
y=y+1 if dy≦0, else y=y−1 x=x+m;
(d) if d is nonpositive, then
(1) darkening the pixel (x,y), and
(2) resetting the variable d=d+2dx′,
else
(i) darkening the pixel (x+1, y), and
(ii) resetting the variable d=d+2dx′−2dy′.

8. The method of claim 7, further comprising the repetition of steps (c) and (d) of claim 7 until u is not less than y[b].

9. A method for ensuring the nonillumination ("darkening") of portions of a pixel grid lying on or immediately to the right of a right edge of a "wide line" segment,
each pixel of said grid being definable by a unique point on a cartesian coordinate system in which distances may be measured in "units,"
each such point having a horizontal component in the x direction and a vertical component in the y direction,
said wide line segment having a width w and whose right edge is defined by an initial point represented by a coordinate (x[a],y[a]) and an endpoint represented by a coordinate (x[b],y[b]),
the horizontal and vertical distances between the initial point and endpoint being represented respectively by dx=x[b]−x[a] and dy=y[b]−y[a],
a "previous pixel," containing a point on or immediately to the right of the wide line edge, being already darkened,
said method comprising the steps of:
(a) initializing the following variables to the following values:
dy′=|dy| if dy<0, else dy′=dy
dx′=dx zmod dy′, where zmod is a modulus operator which renders dx′ equal to a remainder of dx divided by dy′;
m=dx zdiv |dy′|, where |dy′| is the absolute value of dy′ and where zdiv is an operator which renders m equal to an integer result of dividing dx by |dy′|;
d= −ceiling(sqrt((w^2)*dy′^2+dx′^2)))
(b) if d is nonpositive, then
(1) darkening the pixel containing the point m units to the right of and 1 unit up from the previous pixel, and
(2) resetting the variable d=d+2dx′;

(c) else if d is positive, then
(1) darkening the pixel containing the point m+1 units to the right of and 1 unit up from the previous pixel, and
(2) resetting the variable d=d+2dx′−2dy′.

10. A method of illuminating a portion of a pixel grid to represent a portion of a single-pixel-wide line segment,
each pixel of said grid being definable by a unique point on a cartesian coordinate system in which distances may be measured in "units,"
each such point having a horizontal component in the x direction and a vertical component in the y direction,
said line segment being defined by an initial point within an "initial pixel" (x,y) and represented by a coordinate (x[a],y[a]) and an endpoint represented by a coordinate (x[b],y[b]),
said line segment further having a "major-axis component" and a "minor-axis component,"
said method comprising the steps of:
(a) initializing the following variables to the following values:
y=y[a]
x=x[a]
dy=|y[b]−y[a]| if y[b]−y[a]<0, else dy=y[b]−y[a]
dx=|x[b]−x[a]| if x[b]−x[a]<0, else dx=x[b]−x[a]
e1=dy
e2=dy−dx−1
d=−(dx zdiv 2);
(b) setting an "overflow status bit";
(c) illuminating the pixel (x,y);
(d) if said overflow status bit is not set, then resetting the following variables as follows:

x=x+1 d=d+e1 and resetting the overflow status bit;
(e) else resetting the following variables as follows:

x=x+1 y=y+1 d=d+e2 and resetting the overflow status bit.

11. The method of claim 10, further comprising an additional repetition of method steps (c) through (e) of claim 10.

12. A method for illuminating a portion of a pixel grid to represent a portion of a single-pixel-wide line segment,
each pixel of said grid being definable by a unique point on a cartesian coordinate system in which distances may be measured in units,
each such point having a horizontal component in the x direction and a vertical component in the y direction,
said line segment being defined by an initial point within an initial pixel and represented by a coordinate (x[a],y[a]) and an endpoint represented by a coordinate (x[b],y[b]),
said line segment further having a major-axis component and a minor-axis component, the horizontal and vertical distances between the initial point and endpoint being represented respectively by dx=x[b]−x[a] and dy=y[b]−y[a], a previous pixel containing a point on said vector being already illuminated, said method comprising the steps of:

(a) providing a decision table including values for each combination of positive and negative dx and dy (with either dx or dy being the greater of the two), as follows:
   (1) initial values for a decision variable d,
   (2) amounts by which to adjust d in the event of an incrementation by 1 of said major-axis component,
   (3) amounts by which to adjust d in the event of an incrementation by 1 of said minor-axis component, and
   (4) a decision inequality, said decision table being the following:

| Major axis | Sign dx | Sign dy | Edge | Decision inequality | Amount to increment d when x,y incremented y incr | x incr |
|---|---|---|---|---|---|---|
| Y | + | + | L | 0 ≧ 2\|y(dx)\|−2\|x(dy)\|−\|dy\| | 2\|dx\| | −2\|dy\| |
| Y | + | − | R | 0 > 2\|y(dx)\|−2\|x(dy)\|−\|dy\| | 2\|dx\| | −2\|dy\| |
| Y | − | + | L | 0 ≧ 2\|y(dx)\|−2\|x(dy)\|−\|dy\| | 2\|dx\| | −2\|dy\| |
| Y | − | − | R | 0 > 2\|y(dx)\|−2\|x(dy)\|−\|dy\| | 2\|dx\| | −2\|dy\| |
| X | + | + | R | 0 < 2\|y(dx)\|−2\|x(dy)\|+\|dx\| | 2\|dx\| | −2\|dy\| |
| X | + | − | L | 0 ≦ 2\|y(dx)\|−2\|x(dy)\|+\|dx\| | 2\|dx\| | −2\|dy\| |
| X | − | + | R | 0 < 2\|y(dx)\|−2\|x(dy)\|+\|dx\| | 2\|dx\| | −2\|dy\| |
| X | − | − | L | 0 ≦ 2\|y(dx)\|−2\|x(dy)\|+\|dx\| | 2\|dx\| | −2\|dy\| |

(b) setting d to the initial value specified in said decision table;

(c) resetting d as specified in said decision table for a 1-unit incrementation of the major-axis component; and (d) if the decision equality specified in said decision table is satisfied, then illuminating the pixel 1 unit along the major-axis component from said previous pixel, else resetting d as specified in said decision table for a 1-unit incrementation of the minor-axis component and illuminating the pixel 1 unit along the major-axis component and 1 unit along the minor-axis component from said previous pixel.

13. A method for illuminating a portion of a pixel grid to represent a portion of a single-pixel-wide line segment, each pixel of said grid being definable by a unique point on a cartesian coordinate system in which distances may be measured in units, each such point having a horizontal component in the x direction and a vertical component in the y direction, said line segment being defined by an initial point within an initial pixel and represented by a coordinate (x[a],y[a]) and an endpoint represented by a coordinate (x[b],y[b]), said line segment further having a major-axis component and a minor-axis component, the horizontal and vertical distances between the initial point and endpoint being represented respectively by dx=x[b]−x[a] and dy=y[b]−y[a], a previous pixel containing a point on said vector being already illuminated, said method comprising the steps of:

(a) providing a decision table including values for each combination of positive and negative dx and dy (with either dx or dy being the greater of the two), as follows:
   (1) initial values for a decision variable d,
   (2) amounts by which to adjust d in the event of an incrementation by 1 of said major-axis component,
   (3) amounts by which to adjust d in the event of an incrementation by 1 of said minor-axis component, and
   (4) a decision inequality, said decision table being the following:

| Major axis | Sign dx | Sign dy | Edge | Decision inequality | Amount to incr. d when x, y are incremented: y incr | x incr | Initial d value |
|---|---|---|---|---|---|---|---|
| Y | + | + | L | 0 > 2\|y\|dx − 2\|x\|dy − dy − 1 | 2\|dx\| | −2\|dy\| | 2dx − dy − 1 |
| Y | + | − | R | 0 > −2\|y\|dx − 2\|x\|dy − dy | 2\|dx\| | −2\|dy\| | −2dx − dy |
| Y | − | + | L | 0 > 2\|y\|dx − 2\|x\|dy + dy − 1 | 2\|dx\| | −2\|dy\| | 2dx + dy − 1 |
| Y | − | − | R | 0 > −2\|y\|dx − 2\|x\|dy + dy | 2\|dx\| | −2\|dy\| | −2dx + dy |
| X | + | + | R | 0 > 2\|y\|dx + 2\|x\|dy − dx | 2\|dx\| | −2\|dy\| | 2dy − dx |
| X | + | − | L | 0 > 2\|y\|dx + 2\|x\|dy + dx − 1 | 2\|dx\| | −2\|dy\| | 2dy + dx − 1 |
| X | − | + | R | 0 > 2\|y\|dx − 2\|x\|dy − dx | 2\|dx\| | −2\|dy\| | −2dy − dx |
| X | − | − | L | 0 > 2\|y\|dx − 2\|x\|dy + dx − 1 | 2\|dx\| | −2\|dy\| | −2dy + dx − 1 |

(b) setting d to the initial value specified in said decision table;

(c) resetting d as specified in said decision table for a 1-unit incrementation of the major-axis component; and (d) if the decision equality specified in said decision table is satisfied, then illuminating the pixel 1 unit along the major-axis component from said previous pixel, else resetting d as specified in said decision table for a 1-unit incrementation of the minor-axis component and illuminating the pixel 1 unit along the major-axis component and 1 unit along the minor-axis component from said previous pixel.

14. A method for illuminating a portion of a pixel grid to represent a portion of a single-pixel-wide line segment, each pixel of said grid being definable by a unique point on a cartesian coordinate system in which distances may be measured in units, each such point having a horizontal component in the x direction and a vertical component in the y direction, said line segment being defined by an initial point within an initial pixel and represented by a coordinate (x[a],y[a]) and an endpoint represented by a coordinate (x[b],y[b]), said line segment further having a major-axis component and a minor-axis component, the horizontal and vertical distances between the initial point and endpoint being represented respectively by dx=x[b]−x[a] and dy=y[b]−y[a], a previous pixel containing a point on said vector being already illuminated, said method comprising the steps of:

(a) providing a decision table including values for each combination of positive and negative dx and dy (with either dx or dy being the greater of the two), as follows:
  (1) initial values for a decision variable d,
  (2) amounts by which to adjust d in the event of an incrementation by 1 of said major-axis component,
  (3) amounts by which to adjust d in the event of an incrementation by 1 of said minor-axis component, and
  (4) a decision inequality, the major-axis component and 1 unit along the minor-axis component from said previous pixel.

15. A method of illuminating a portion of a pixel grid to represent a portion of a line segment, each pixel of said grid being definable by a unique point on a cartesian coordinate system in which distances may be measured in units, each such point having a horizontal component in the x direction and a vertical component in the y direction, said line segment being defined by an initial point within an initial pixel and represented by a coordinate (x[a],y[a]) and an endpoint represented by a coordinate (x[b],y[b]), said line segment further having a major-axis component and a minor-axis component, the horizontal and vertical distances between the initial point and endpoint being represented respectively by dx=x[b]−x[a] and dy=y[b]−y[a], a previous pixel containing a point on said vector being already illuminated, said method comprising the steps of:

(a) providing a decision table including values for each combination of positive and negative dx and dy (with either dx or dy being the greater of the two), as follows:
  (1) initial values for a decision variable d,
  (2) a first error increment constant e1, and
  (3) a error increment constant e2,
said decision table being the following:

| Major axis | Sign dx | Sign dy | Edge | Initial d value d[1] | e1 | e2 |
|---|---|---|---|---|---|---|
| Y | + | + | L | (−dy − 1) zdiv 2 | +dx | +dx − dy − 1 |
| Y | + | − | R | (−dy − 0) zdiv 2 | −dx | −dx − dy − 1 |
| Y | − | + | L | (+dy − 1) zdiv 2 | +dx | +dx + dy − 1 |
| Y | − | − | R | (+dy − 0) zdiv 2 | −dx | −dx + dy − 1 |
| X | + | + | R | (−dx − 0) zdiv 2 | +dy | +dy − dx − 1 |
| X | + | − | L | (+dx − 1) zdiv 2 | +dy | +dy + dx − 1 |
| X | − | + | R | (−dx − 0) zdiv 2 | −dy | −dy − dx − 1 |
| X | − | − | L | (+dx − 1) zdiv 2 | −dy | −dy + dx − 1 | said decision table being the following:

(b) setting d to the initial value specified in said deci-

| Major axis | Sign dy | Sign dx | Amount to incr. d when x, y are incremented: y incr | Amount to incr. d when x, y are incremented: x incr | Initial d value d[1] | Computation to Be Performed of Initial d Value |
|---|---|---|---|---|---|---|
| Y | + | + | −2ndx | 2ndy | −2ndx + ndy − 1 | ~2ndx + ndy + 0 |
| Y | + | − | 2ndx | 2ndy | 2ndx + ndy | 2ndx + ndy + 0 |
| Y | − | + | −2ndx | −2ndy | −2ndx − ndy − 1 | ~2ndx + ~ndy + 1 |
| Y | − | − | 2ndx | −2ndy | 2ndx − ndy | 2ndx + ~ndy + 1 |
| X | + | + | 2ndx | −2ndy | −2ndy + ndx | ~2ndy + ndx + 1 |
| X | + | − | −2ndx | −2ndy | −2ndy − ndx − 1 | ~2ndy + ~ndx + 1 |
| X | − | + | 2ndx | 2ndy | 2ndy + ndx | 2ndy + ndx + 0 |
| X | − | − | −2ndx | 2ndy | 2ndy − ndx − 1 | 2ndy + ~ndx + 0 |

(b) setting d to the initial value specified in said decision table;

(c) resetting d as specified in said decision table for a 1-unit incrementation of the major-axis component; and (d) if the decision equality specified in said decision table is satisfied, then illuminating the pixel 1 unit along the major-axis component from said previous pixel, else resetting d as specified in said decision table for a 1-unit incrementation of the minor-axis component and illuminating the pixel 1 unit along sion table;

(c) initializing the following variables to the following values:

$y=y[a]$ $x=x[a]$ (d) setting an overflow status bit;
(e) illuminating the pixel (x,y);
(f) if said overflow status bit is not set, then resetting the following variables as follows:

$x = x + 1$ $d = d + e1$ and resetting the overflow status bit;
(g) else resetting the following variables as follows:

| Major axis | Sign dx | Sign dy | Edge | Initial d value d[1] | e1 | e2 |
|---|---|---|---|---|---|---|
| Y | + | + | L | $\sim |dy|$ zdiv 2 | $|dx|$ | $|dx| - |dy| - 1$ |
| Y | + | − | R | $-|dy|$ zdiv 2 | $|dx|$ | $|dx| - |dy| - 1$ |
| Y | − | + | L | $\sim |dy|$ zdiv 2 | $|dx|$ | $|dx| - |dy| - 1$ |
| Y | − | − | R | $-|dy|$ zdiv 2 | $|dx|$ | $|dx| - |dy| - 1$ |
| X | + | + | R | $-|dy|$ zdiv 2 | $|dy|$ | $|dy| - |dx| - 1$ |
| X | + | − | L | $\sim |dy|$ zdiv 2 | $|dy|$ | $|dy| - |dx| - 1$ |
| X | − | + | R | $-|dy|$ zdiv 2 | $|dy|$ | $|dy| - |dx| - 1$ |
| X | − | − | L | $\sim |dy|$ zdiv 2 | $|dy|$ | $|dy| - |dx| - 1$ |

$x = x + 1$ $y = y + 1$ $d = d + e2$ and resetting the overflow status bit.

16. A method of illuminating a portion of a pixel grid to represent a portion of a line segment,
each pixel of said grid being definable by a unique point on a cartesian coordinate system in which distances may be measured in units,
each such point having a horizontal component in the x direction and a vertical component in the y direction,
said line segment being defined by an initial point within an initial pixel and represented by a coordinate (x[a],y[a]) and an endpoint represented by a coordinate (x[b],y[b]),
said line segment further having a major-axis component and a minor-axis component,
the horizontal and vertical distances between the initial point and endpoint being represented respectively by dx = x[b] − x[a] and dy = y[b] − y[a],
a previous pixel containing a point on said vector being already illuminated,
said method comprising the steps of:
(a) providing a decision table including values for each combination of positive and negative dx and dy (with either dx or dy being the greater of the two), as follows:
(1) initial values for a decision variable d,
(2) a first error increment constant e1, and
(3) a error increment constant e2,
said decision table being the following:

(b) setting d to the initial value specified in said decision table;
(c) initializing the following variables to the following values:

$y = y[a]$ $x = x[a]$ (d) setting an overflow status bit;
(e) illuminating the pixel (x,y);
(f) if said overflow status bit is not set, then resetting the following variables as follows:

$x = x + 1$ $d = d + e1$ and resetting the overflow status bit;
(g) else resetting the following variables as follows:

$x = x + 1$ $y = y + 1$ $d = d + e2$ and resetting the overflow status bit.

* * * * *

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

It is certified that error appears in the above-indentified patent and that said Letters Patent is hereby corrected as shown below:

Column 4, Line 5, after "29", insert --to either edge 25 or 27 is w/2. The horizontal width h of--.

Column 4, Line 21, delete "P2", and insert --P2'--.

Column 6, Line 28, delete "(1", and insert --(1).

Column 6, Line 34, delete "a b", and insert --a^b--.

Column 7, Line 33, delete "d[i]$\leq$0", and insert --d[i]$\leq$0--.

Column 10, Line 16, delete "0$\leq$dx", and insert --0$\leq$dx--.

Column 10, Line 2, delete x$\leq$r,, and insert --x$\leq$r,--.

Column 10, Line 62, delete "error[i]$\leq$0", and insert -- error[i]$\leq$0--.

Column 11, Line 22, delete "d[i]$\leq$0", and insert --d[i]$\leq$0--.

Column 12, Line 9, delete "0$\leq$dx$\leq$dy.", and insert --0$\leq$dx$\leq$dy.--.

Column 13, Line 31, delete "<dx$\leq$2dy.", and insert --<dx$\leq$2dy.--.

Column 13, Line 36, delete "0<dx'$\leq$dy", and insert --0<dx'$\leq$dy--.

Column 14, Line 3, delete "cells", and insert --calls--.

Column 15, Line 58, delete "h 2", and insert --h^2--.

Column 16, Line 1, delete "a b", and insert --a^b--.

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

It is certified that error appears in the above-indentified patent and that said Letters Patent is hereby corrected as shown below:

Column 17, Line 7, delete "$l \leq 0.$", and insert --$l \leq 0$--.

Column 17, Line 7, delete "$p \leq 0,$", and insert --$p \leq 0$,--.

Column 17, Line 8, delete "floor(p)$\leq 0.$", and insert --floor(p)$\leq 0$.--.

Column 17, Line 17, delete "* (dy 2", and insert --* (dy^2--.

Column 17, Line 23, delete "* (dy 2", and insert --* (dy^2--.

Column 19, Line 57, delete "$0 \geq d$", and insert --$0 \geq d$--.

Column 20, Line 31, delete "51)", and insert --(51)--.

Column 21, Line 1, delete "$d \leq 0$", and insert --$0 \leq d$--.

Column 21, Line 9, delete "$0 \leq d$", and insert --$0 \leq d$--.

Column 21, Line 14, delete "$0 \leq d$", and insert --$0 \leq d$--.

Column 22, Line 68, delete " + 1is", and insert -- + 1 is".

Column 23, Line 15, delete "$d \leq 0$", and insert --$d \leq 0$--.

Column 23, Line 19, delete "$d \leq 0$, then d - 1 $\leq$ - 1,", and insert --$d \leq 0$, then d - 1 $\leq$ - 1,--.

Column 23, Line 21, delete "$d \leq 0$", and insert --$d \leq 0$--.

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

It is certified that error appears in the above-indentified patent and that said Letters Patent is hereby corrected as shown below:

Column 25, Line 32, delete "$d \leq 0$", and insert --$d \geq 0$--.

Column 27, Line 10, delete "$d[i] \leq 0$", and insert --$d[i] \leq 0$--.

Column 27, Line 14, delete "serving", and insert --saving--.

Column 37, delete Appendix 6 in its entirety, and insert the following Appendix 6:

APPENDIX 6

UNSIGNED DECISION VARIABLES FOR SINGLE-PIXEL-WIDE COMPUTATION

| Maj | Sign dy | dx | Edge | Decision inequality | Amount to incr. d when x, y are incremented: y incr. | x incr. |
|---|---|---|---|---|---|---|
| Y | + | + | L | $0 \geq 2\lvert y(dx) \rvert - 2\lvert x(dy) \rvert - \lvert dy \rvert$ | $2\lvert dx \rvert$ | $-2\lvert dy \rvert$ |
| Y | + | − | R | $0 > 2\lvert y(dx) \rvert - 2\lvert x(dy) \rvert - \lvert dy \rvert$ | $2\lvert dx \rvert$ | $-2\lvert dy \rvert$ |
| Y | − | + | L | $0 \geq 2\lvert y(dx) \rvert - 2\lvert x(dy) \rvert - \lvert dy \rvert$ | $2\lvert dx \rvert$ | $-2\lvert dy \rvert$ |
| Y | − | − | R | $0 > 2\lvert y(dx) \rvert - 2\lvert x(dy) \rvert - \lvert dy \rvert$ | $2\lvert dx \rvert$ | $-2\lvert dy \rvert$ |
| X | + | + | R | $0 < 2\lvert y(dx) \rvert - 2\lvert x(dy) \rvert + \lvert dx \rvert$ | $2\lvert dx \rvert$ | $-2\lvert dy \rvert$ |
| X | + | − | L | $0 \leq 2\lvert y(dx) \rvert - 2\lvert x(dy) \rvert + \lvert dx \rvert$ | $2\lvert dx \rvert$ | $-2\lvert dy \rvert$ |
| X | − | + | R | $0 < 2\lvert y(dx) \rvert - 2\lvert x(dy) \rvert + \lvert dx \rvert$ | $2\lvert dx \rvert$ | $-2\lvert dy \rvert$ |
| X | − | − | L | $0 \leq 2\lvert y(dx) \rvert - 2\lvert x(dy) \rvert + \lvert dx \rvert$ | $2\lvert dx \rvert$ | $-2\lvert dy \rvert$ |

UNITED STATES PATENT AND TRADEMARK OFFICE
CERTIFICATE OF CORRECTION

PATENT NO. : 5,202,960
DATED      : April 13, 1993
INVENTOR(S): Larry D. Seiler

It is certified that error appears in the above-indentified patent and that said Letters Patent is hereby corrected as shown below:

Column 37, delete Appendix 7 in its entirety, and insert the following Appendix 7:

APPENDIX 7

SIGN-BIT DECISION VARIABLES FOR SINGLE-PIXEL-WIDE COMPUTATION

| Maj | Sign dy | dx | Edge | Decision inequality | Amount to incr. d when x, y are incremented: y incr. | x incr. | Initial d value |
|---|---|---|---|---|---|---|---|
| Y | + | + | L | $0 > 2|y|dx - 2|x|dy - dy - 1$ | $2|dx|$ | $-2|dy|$ | $2dx-dy-1$ |
| Y | + | − | R | $0 > -2|y|dx - 2|x|dy - dy$ | $2|dx|$ | $-2|dy|$ | $-2dx-dy$ |
| Y | − | + | L | $0 > 2|y|dx - 2|x|dy + dy - 1$ | $2|dx|$ | $-2|dy|$ | $2dx+dy-1$ |
| Y | − | − | R | $0 > -2|y|dx - 2|x|dy + dy$ | $2|dx|$ | $-2|dy|$ | $-2dx+dy$ |
| X | + | + | R | $0 > 2|y|dx + 2|x|dy - dx$ | $2|dx|$ | $-2|dy|$ | $2dy-dx$ |
| X | + | − | L | $0 > 2|y|dx + 2|x|dy + dx - 1$ | $2|dx|$ | $-2|dy|$ | $2dy+dx-1$ |
| X | − | + | R | $0 > 2|y|dx - 2|x|dy - dx$ | $2|dx|$ | $-2|dy|$ | $-2dy-dx$ |
| X | − | − | L | $0 > 2|y|dx - 2|x|dy + dx - 1$ | $2|dx|$ | $-2|dy|$ | $-2dy+dx-1$ |

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

It is certified that error appears in the above-indentified patent and that said Letters Patent is hereby corrected as shown below:

Column 43, delete Appendix 13 in its entirety, and insert the following Appendix 13:

APPENDIX 13

DETERMINATION OF VECTOR ORIENTATION

Assumptions: $dy = y[b] - y[a]$ (not absolute values)
$dx = x[b] - x[a]$ (  "      "       "   )

| Sign dy | dx | Decision inequality | Major comparison | Delta value computed |
|---|---|---|---|---|
| + | + | dx > dx | 0 > -ndx + ndy + 1 | $\|dx\| - \|dy\|$ |
| + | - | dy > -dx | 0 > ndx + ndy | $\|dx\| - \|dy\|$ |
| - | + | -dy ≥ dx | 0 > -ndx + -ndy + 1 | $\|dx\| - \|dy\| -1$ |
| - | - | -dy > -dx | 0 > ndx + -ndy + 1 | $\|dx\| - \|dy\|$ |

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

Page 6 of 9

It is certified that error appears in the above-indentified patent and that said Letters Patent is hereby corrected as shown below:

Column 43, delete Appendix 14 in its entirety, and insert the following Appendix 14:

APPENDIX 14

SIMULTANEOUS COMPUTATION OF SUM OF
MAJOR- AND MINOR-AXIS INCREMENT TERMS

Assumptions: dy = y[b] - y[a] (not absolute values)
dx = x[b] - x[a] ( "      "       " )

| Maj | Sign dy | Sign dx | Major comparison | Delta value computed | 1/2 times minor-axis error incr. |
|---|---|---|---|---|---|
| Y | + | + | 0 > -ndx +  ndy + 1 | \|dx\|-\|dy\| | Delta + 0 |
| Y | + | - | 0 >  ndx +  ndy + 0 | \|dx\|-\|dy\| | Delta + 0 |
| Y | - | + | 0 > -ndx + -ndy + 1 | \|dx\|-\|dy\| -1 | Delta + 1 |
| Y | - | - | 0 >  ndx + -ndy + 1 | \|dx\|-\|dy\| | Delta + 0 |
| X | + | + | 0 ≤ -ndx +  ndy + 1 | \|dx\|-\|dy\| | -Delta + 1 |
| X | + | - | 0 ≤  ndx +  ndy + 0 | \|dx\|-\|dy\| | -Delta + 1 |
| X | - | + | 0 ≤ -ndx + -ndy + 1 | \|dx\|-\|dy\| -1 | -Delta + 0 |
| X | - | - | 0 ≤  ndx + -ndy + 1 | \|dx\|-\|dy\| | -Delta + 1 |

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

It is certified that error appears in the above-indentified patent and that said Letters Patent is hereby corrected as shown below:

Column 43, delete Appendix 15 in its entirety, and insert the following Appendix 15:

APPENDIX 15

REDUCED-BIT SIMULTANEOUS COMPUTATION OF SUM OF MAJOR- AND MINOR-AXIS INCREMENT TERMS

Assumptions: $dy = y[b] - y[a]$ (not absolute values)
$dx = x[b] - x[a]$ ( "    "    " )

```
        Sign                                Delta value    Minor-axis
  Maj  dy  dx    Major comparison           computed       error incr.
  ----------------------------------------------------------------------
   Y   +   +     0 >  -ndx +  ndy + 1       |dx|-|dy|      Delta + 0
   Y   +   -     0 >   ndx +  ndy + 0       |dx|-|dy|      Delta + 0
 * Y   -   +     0 >  -ndx + -ndy + 1       |dx|-|dy| -1   Delta + 1
   Y   -   -     0 >   ndx + -ndy + 1       |dx|-|dy|      Delta + 0

* X   +   +     0 ≤  -ndx +  ndy + 1       |dx|-|dy|      -Delta + 1
 * X   +   -     0 ≤   ndx +  ndy + 0       |dx|-|dy|      -Delta + 1
   X   -   +     0 ≤  -ndx + -ndy + 1       |dx|-|dy| -1   -Delta + 0
 * X   -   -     0 ≤   ndx + -ndy + 1       |dx|-|dy|      -Delta + 1
```

UNITED STATES PATENT AND TRADEMARK OFFICE
CERTIFICATE OF CORRECTION

PATENT NO.  : 5,202,960
DATED       : April 13, 1993
INVENTOR(S) : Larry D. Seiler It is certified that error appears in the above-indentified patent and that said Letters Patent is hereby corrected as shown below:

Column 44, Line 62, delete "dy $\geq$ 0,", and insert --dy $\geq$ 0,--.

Column 46, Line 6, delete "dy $\geq$ 0,", and insert --dy $\geq$ 0,--.

Column 47, Line 17, delete "ceiling(sqrt((w 2) * dy' 2 + dx' 2))", and insert --ceiling(sqrt((w^2) * dy'^2 + dx'^2))--

Column 47, Line 22, delete "y = y + 1 if dy $\leq$ 0, else y = y - 1  x = x + m;", and insert --y = y + 1 if dy $\geq$ 0, else y = y - 1  x = x + m;--.

Column 47, Line 30, delete "u" and insert --y--.

Column 48, Line 26, delete "y[a] < 0. else", and insert --y[a] < 0, else--.

Column 48, Line 28, delete "x[a] < 0. else", and insert --x[a] < 0, else--.

Column 49, Line 21, delete the table in its entirety, and insert the following table:

| Maj Axis | Sign dy | Sign dx | Edge | Decision inequality | Amount to incr. d when x, y are incremented: y incr. | x incr. |
|---|---|---|---|---|---|---|
| y | + | + | L | 0 $\geq$ 2\|y(dx)\| - 2\|x(dy)\| - \|dy\| | 2\|dx\| | -2\|dy\| |
| y | + | - | R | 0 > 2\|y(dx)\| - 2\|x(dy)\| - \|dy\| | 2\|dx\| | -2\|dy\| |
| y | - | + | L | 0 $\geq$ 2\|y(dx)\| - 2\|x(dy)\| - \|dy\| | 2\|dx\| | -2\|dy\| |
| y | - | - | R | 0 > 2\|y(dx)\| - 2\|x(dy)\| - \|dy\| | 2\|dx\| | -2\|dy\| |
| x | + | + | R | 0 < 2\|y(dx)\| - 2\|x(dy)\| + \|dx\| | 2\|dx\| | -2\|dy\| |
| x | + | - | L | 0 $\leq$ 2\|y(dx)\| - 2\|x(dy)\| + \|dx\| | 2\|dx\| | -2\|dy\| |
| x | - | + | R | 0 < 2\|y(dx)\| - 2\|x(dy)\| + \|dx\| | 2\|dx\| | -2\|dy\| |
| x | - | - | L | 0 $\leq$ 2\|y(dx)\| - 2\|x(dy)\| + \|dx\| | 2\|dx\| | -2\|dy\| |

UNITED STATES PATENT AND TRADEMARK OFFICE
CERTIFICATE OF CORRECTION

PATENT NO. : 5,202,960
DATED : April 13, 1993
INVENTOR(S) : Larry D. Seiler

It is certified that error appears in the above-indentified patent and that said Letters Patent is hereby corrected as shown below:

Column 50, Line 41, delete the table in its entirety, and insert the following table:

| Maj Axis | Sign dy | dx | Edge | Decision inequality | Amount to incr. d when x, y are incremented: y incr. | x incr. | Initial d value |
|---|---|---|---|---|---|---|---|
| y | + | + | L | 0 > 2\|y\|dx - 2\|x\|dy - dy - 1 | 2\|dx\| | -2\|dy\| | 2dx-dy-1 |
| y | + | - | R | 0 >-2\|y\|dx - 2\|x\|dy - dy | 2\|dx\| | -2\|dy\| | -2dx-dy |
| y | - | + | L | 0 > 2\|y\|dx - 2\|x\|dy + dy - 1 | 2\|dx\| | -2\|dy\| | 2dx+dy-1 |
| y | - | - | R | 0 >-2\|y\|dx - 2\|x\|dy + dy | 2\|dx\| | -2\|dy\| | -2dx+dy |
| x | + | + | R | 0 > 2\|y\|dx + 2\|x\|dy - dx | 2\|dx\| | -2\|dy\| | 2dy-dx |
| x | + | - | L | 0 > 2\|y\|dx + 2\|x\|dy + dx - 1 | 2\|dx\| | -2\|dy\| | 2dy+dx-1 |
| x | - | + | R | 0 > 2\|y\|dx - 2\|x\|dy - dx | 2\|dx\| | -2\|dy\| | -2dy-dx |
| x | - | - | L | 0 > 2\|y\|dx - 2\|x\|dy + dx - 1 | 2\|dx\| | -2\|dy\| | -2dy+dx-1 |

Signed and Sealed this

Tenth Day of May, 1994

BRUCE LEHMAN

Attest:

*Attesting Officer*                     *Commissioner of Patents and Trademarks*